US012240714B2

(12) United States Patent
Sun et al.

(10) Patent No.: US 12,240,714 B2
(45) Date of Patent: Mar. 4, 2025

(54) ROBOTIC SYSTEM TO LOAD AND UNLOAD TRUCKS AND OTHER CONTAINERS

(71) Applicant: Dexterity, Inc., Redwood City, CA (US)

(72) Inventors: Zhouwen Sun, San Mateo, CA (US); Michael Fisher, Palo Alto, CA (US); Robert Holmberg, Mountain View, CA (US); Harry Zhe Su, Union City, CA (US); Talbot Morris-Downing, Redwood City, CA (US); Timothy Ryan, San Francisco, CA (US); Samir Menon, Menlo Park, CA (US)

(73) Assignee: Dexterity, Inc., Redwood City, CA (US)

( * ) Notice: Subject to any disclaimer, the term of this patent is extended or adjusted under 35 U.S.C. 154(b) by 212 days.

(21) Appl. No.: 18/109,611

(22) Filed: Feb. 14, 2023

(65) Prior Publication Data

US 2023/0271323 A1      Aug. 31, 2023

Related U.S. Application Data

(60) Provisional application No. 63/310,027, filed on Feb. 14, 2022.

(51) Int. Cl.
*B25J 9/16*       (2006.01)
*B25J 5/00*       (2006.01)
(Continued)

(52) U.S. Cl.
CPC .............. *B65G 67/08* (2013.01); *B25J 5/007* (2013.01); *B25J 9/0093* (2013.01); *B25J 9/126* (2013.01);
(Continued)

(58) Field of Classification Search
CPC ...... B65G 67/08; B65G 41/006; B65G 67/02; B65G 2203/041; B25J 5/007;
(Continued)

(56) References Cited

U.S. PATENT DOCUMENTS 4,163,183 A * 7/1979 Engelberger ........... G05B 19/42
318/568.18
4,937,759 A * 6/1990 Vold ................... G05B 19/4061
700/262
(Continued)

FOREIGN PATENT DOCUMENTS

JP          2010221355          10/2010

*Primary Examiner* — Jaime Figueroa
(74) *Attorney, Agent, or Firm* — Van Pelt, Yi & James LLP

(57) ABSTRACT

A robotic system is disclosed which includes a robotic arm having n degrees of freedom, the robotic arm comprising a base and a set of serially connected links and joints connected to the base; an enabler joint assembly comprising a mounting location at which the base of the robotic arm is mounted and having a rotational axis, offset from the mounting location, about which the enabler joint assembly is configured to rotate the mounting location; and a processor configured to control a first set of motors associated with the n degrees of freedom of the robotic arm and an enabler joint motor comprising the enabler joint assembly to control operation of the robotic arm within an extended operating space defined at least in part by the n degrees of freedom of the robotic arm and an $(n+1)^{th}$ degree of freedom provided by the enabler joint assembly.

20 Claims, 17 Drawing Sheets

(51) Int. Cl.
  *B25J 9/00* (2006.01)
  *B25J 9/12* (2006.01)
  *B65G 41/00* (2006.01)
  *B65G 67/02* (2006.01)
  *B65G 67/08* (2006.01)

(52) U.S. Cl.
  CPC ............. *B25J 9/162* (2013.01); *B25J 9/1669* (2013.01); *B25J 9/1682* (2013.01); *B65G 41/006* (2013.01); *B65G 67/02* (2013.01); *B65G 2203/041* (2013.01)

(58) Field of Classification Search
  CPC . B25J 9/0093; B25J 9/126; B25J 9/162; B25J 9/1669; B25J 9/1682; B25J 9/0084; G05B 2219/40298; G05B 2219/45063
  USPC ................ 700/245–264; 318/568.11–568.25
  See application file for complete search history.

(56) References Cited

U.S. PATENT DOCUMENTS

| | | | | |
|---|---|---|---|---|
| 5,276,390 A * | 1/1994 | Fisher | ................... | B25J 9/1633 |
| | | | | 700/262 |
| 5,357,424 A * | 10/1994 | Kakizaki | ............... | B25J 9/1664 |
| | | | | 700/254 |
| 5,550,953 A * | 8/1996 | Seraji | ...................... | B25J 9/162 |
| | | | | 700/262 |
| 5,737,500 A * | 4/1998 | Seraji | ..................... | B25J 9/1643 |
| | | | | 700/262 |
| 5,781,705 A * | 7/1998 | Endo | ...................... | B25J 9/1643 |
| | | | | 318/568.22 |
| 8,126,114 B2 * | 2/2012 | Naylor | ................... | A61B 34/30 |
| | | | | 378/65 |
| 8,489,229 B2 * | 7/2013 | Kuehnemann | ......... | B65G 57/00 |
| | | | | 700/214 |
| 9,102,055 B1 * | 8/2015 | Konolige | ............... | B25J 9/1612 |
| 9,333,649 B1 * | 5/2016 | Bradski | ................... | B25J 19/00 |
| 9,393,686 B1 * | 7/2016 | Bradski | ................... | G06T 19/003 |
| 9,486,921 B1 * | 11/2016 | Straszheim | ............ | B25J 9/1697 |
| 9,870,002 B1 * | 1/2018 | Holmberg | ................ | G05B 6/02 |
| 9,938,092 B2 * | 4/2018 | McMurrough | ........ | B25J 9/0093 |
| 10,661,444 B2 * | 5/2020 | McCollum | ........... | B25J 15/0052 |
| 10,894,676 B2 * | 1/2021 | Turpin | .................. | B25J 19/023 |
| 11,203,492 B2 * | 12/2021 | Hamilton | ............... | B65G 47/26 |
| 11,584,595 B2 * | 2/2023 | Hamilton | ............... | B65G 21/12 |
| 11,691,830 B2 * | 7/2023 | Turpin | ................. | G06Q 10/043 |
| | | | | 700/217 |
| 11,883,962 B2 * | 1/2024 | Raghunathan | ......... | B25J 9/1666 |
| 12,103,792 B2 * | 10/2024 | Turpin | ................... | B65G 59/02 |
| 12,116,215 B2 * | 10/2024 | Hamilton | ............... | B65G 37/00 |
| 2004/0103740 A1 | 6/2004 | Townsend | | |
| 2010/0069920 A1 * | 3/2010 | Naylor | ................... | A61B 34/71 |
| | | | | 606/130 |
| 2012/0277901 A1 | 11/2012 | Jacobsen | | |
| 2015/0203304 A1 * | 7/2015 | Morency | ................ | B65G 59/02 |
| | | | | 414/797 |
| 2016/0137435 A1 * | 5/2016 | Tanaka | ................... | B65G 65/00 |
| | | | | 414/800 |
| 2016/0368720 A1 * | 12/2016 | Criswell | ................ | B65G 67/08 |
| 2018/0072517 A1 | 3/2018 | Girtman | | |
| 2021/0171294 A1 * | 6/2021 | Hart | ....................... | B25J 9/0009 |
| 2021/0298851 A1 * | 9/2021 | Huang | ................... | A61B 34/35 |
| 2022/0379478 A1 * | 12/2022 | Raghunathan | ......... | B25J 9/1676 |
| 2023/0103821 A1 * | 4/2023 | Lovett | ................. | B25J 15/0028 |
| | | | | 294/183 |

\* cited by examiner

ROBOTIC SYSTEM TO LOAD AND UNLOAD TRUCKS AND OTHER CONTAINERS

CROSS REFERENCE TO OTHER APPLICATIONS

This application claims priority to U.S. Provisional Patent Application No. 63/310,027 entitled ROBOTIC SYSTEM TO LOAD AND UNLOAD TRUCKS AND OTHER CONTAINERS filed Feb. 14, 2022 which is incorporated herein by reference for all purposes.

BACKGROUND OF THE INVENTION

Industrial robots are designed to include a predetermined number of degrees of freedom (DOF). A common example is a six degree of freedom robotic arm. Such an arm may have two degrees of freedom (pitch/bend and roll) at/near each of three joints. A joint near the base, sometimes referred to as a "shoulder" joint; an "elbow" joint connected by a first link to the shoulder joint; and a "wrist" joint connect to the elbow joint by a second link and to a robotic end effector, such as a gripper, hand, or claw or a suction-type end effector, at the distal end.

An industrial robot, such as a 6-DOF robotic arm, typically is equipped with a controller configured to receive commands and to translate those commands into a set and/or series of control signals to motor controllers associated with each joint and/or degree of freedom. The motor controllers supply current to the respective motors to move the robotic arm in a manner that is responsive to the command.

An industrial robot, such as a 6-DOF robotic arm, typically is constrained by its physical configuration, environment, and control software to operate within an operationally accessible space that is limited by its reach and supported poses and orientations.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to extend the operational reach and capabilities of a robot, such as a robotic arm, by integrating an additional joint, sometimes referred to herein as an "enabler" joint, to provide an additional degree of freedom, further reach, and/or added flexibility. In various embodiments, the additional degree of freedom is provided about an axis that is at a non-zero, non-right angle to a longitudinal (e.g., roll) axis of the base of the robot. In some embodiments, the enabler joint is controlled by a controller that is separate from but operated in coordination with the robot controller of robotic arm (or other robot). In some embodiments, an integrated controller is provided and used, which controls the enabler joint and the robot joints in an integrated manner, controlling the respective motor controllers to move the enabler joint and other joints in a coordinated way to move the robot through a trajectory within the enabler joint-extended operational space reachable by the robot.

Figure 1A:
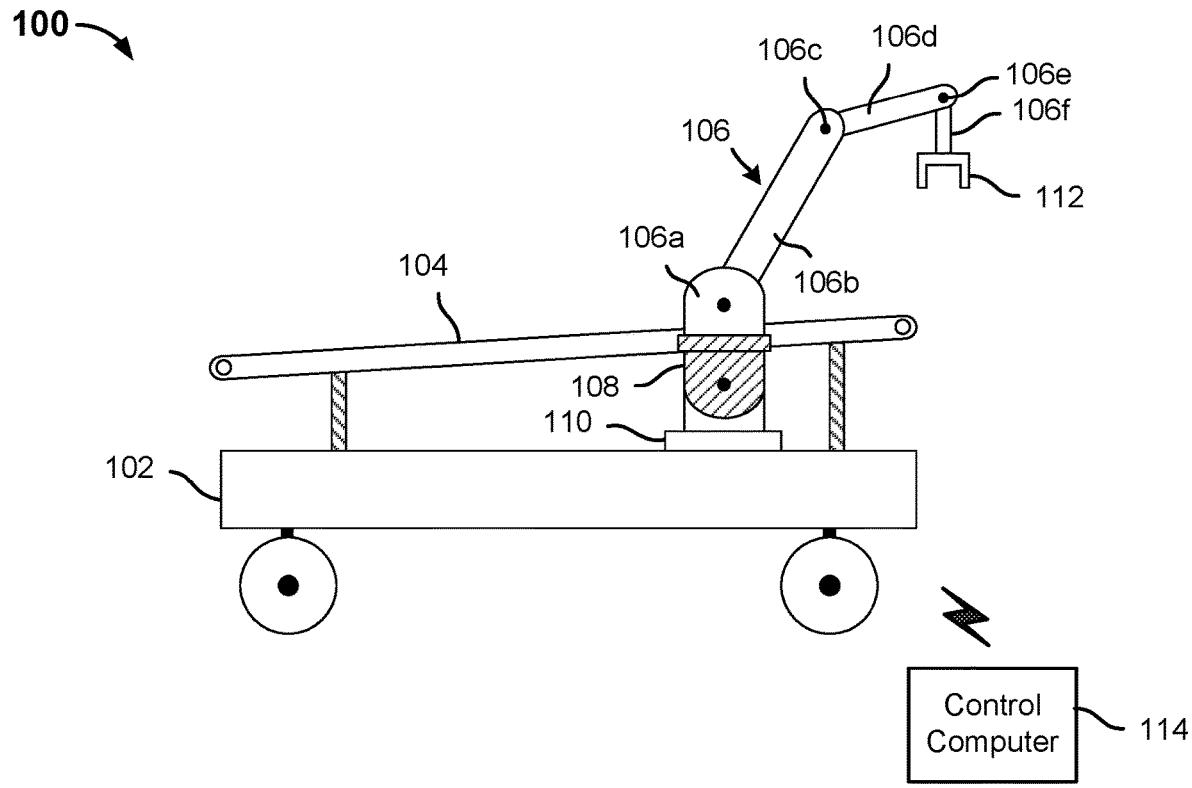
FIG. 1A is a diagram illustrating an embodiment of a robotic system comprising a robotic arm and a robotically controlled enabler joint.

FIG. 1A is a diagram illustrating an embodiment of a robotic system comprising a robotic arm and a robotically controlled enabler joint. In the example shown, robotic system 100 includes a robotically controlled mobile chassis 102 on which a robotically controlled conveyor 104 is mounted along a central longitudinal axis of chassis 102. A robotic arm 106 is rotatably mounted on the chassis via an enabler joint comprising a transfer plate 108 and an enabler joint base 110 fixedly mounted to chassis 102. In various embodiments, the enabler joint further includes a robotically controlled enabler joint motor, not shown in FIG. 1A, and an associated motor controller, configured to be used to rotate the transfer plate 108 about a rotational axis of the enabler joint, as described further below.

In the example shown, robotic arm 106 includes a base and shoulder joint 106a, an upper arm or link 106b, an elbow joint 106c, a forearm (lower link) 106d, a wrist joint 106e, and end effector connector link 106f. In some embodiments, robotic arm 106 comprises a 6 DOF robotic arm, with degrees of freedom including a waist joint (rotation of base 106a about an axis substantially orthogonal to a mounting plane of base 106a), the shoulder joint comprising base 106a (bending about an axis of rotation of the shoulder joint), bending and rotational degrees of freedom associated with the elbow joint 106c and/or forearm 106d, and bending and rotational (or yaw) degrees of freedom associated with wrist joint 106e and/or link 106f.

While in the example shown in FIG. 1A and described in the preceding paragraph the robotic arm comprises a base and two links serially connected by robotically actuated joints, each having two degrees of freedom, in other embodiments the robotic arm may have more or fewer links, joints, and/or degrees of freedom. The respective degrees of freedom of a robotic arm such as robotic arm 106 are referred to sometimes as the n degrees of freedom of the robotic arm, representing the degrees of freedom provided by the respective joints and/or links of a given robotic arm.

Referring further to FIG. 1A, in the example shown the robotic arm 106 has a robotically controlled end effector 112 affixed to the free moving, operative end of robotic arm 106, in this case via wrist link 106f. The end effector 112 may be any type of end effector suitable to a given robotic task or application, such as a gripper, hand, suction-based gripper, or any other type of tool or manipulator.

In various embodiments, a control computer, such as control computer 114 of FIG. 1A, controls one or more of chassis 102, conveyor 104, robotic arm 106, enabler joint 108, 110, and end effector 112, singly or in combination (e.g., simultaneously), to perform a task or set of tasks associated with a robotic "application" that the robotic system 100 has been deployed and configured to perform. Examples include, without limitation, loading or unloading a truck or other container, stacking items onto or removing them from a pallet or other receptacle, and assembly kits from items on or in shelves, bins, or other receptacles.

For example, in some embodiments, robotic system 100 may be used to load a truck or other container. Items may arrive at the left end of conveyor 104, as shown in FIG. 1A, e.g., from an upstream conveyor or other source of items. Conveyor 104 may be operated under robotic control to advance items toward the robotic arm 106 disposed at the right side of conveyor 104, as shown in FIG. 1A, and robotic arm 106 and/or enabler joint 108, 110 operated under robotic control to pick items from the conveyor 104 and place them in the truck (or other destination). A vision or other perception system, e.g., provide by control computer 114 based on inputs from cameras mounted on or near the robotic system 104 (not shown in FIG. 1A), may be used to generate a three dimensional view of the workspace and the items arriving via conveyor 104. The control computer may use a database or other repository of knowledge about the arriving items to determine attributes of the items, and the attributes may be used to determine and implement a plan to pick and place the items using the robotically controlled instrumentalities comprising robotic system 100, e.g., one or more of chassis 102, conveyor 104, robotic arm 106, enabler joint 108, 110, and end effector 112. For example, robotic arm 106 and enabler joint 108, 110 may be operated in concert to move the end effector into a position to pick a given item, move the item along a planned trajectory, and place the item in a planned destination, such as a location the control computer 114 has selected for the item based on its attributes and the estimated state of the pile, stack, or other arrangement of items placed previously.

In various embodiments, the control computer 114 may communicate, e.g., via wireless or wired communications, with one or more controllers comprising the robotic system 100. For example, separate controllers may be provided onboard one or more of chassis 102, conveyor 104, enabler joint assembly 108, 110, and/or robotic arm 106 and end effector 112, to control the respective robotically controlled instrumentalities. Each controller may provide low level control signals to one or more motor controllers, e.g., to cause the motor controller(s) to supply current to associated motors, such as joint motors associated with the degrees of freedom or robotic arm 106, so as to cause the associated joints to be actuated, in coordination, to position the end effector 112 to pick an item, move it through a trajectory, and place the item in a destination.

In some embodiments, an integrated onboard controller may be included in robotic system 100. For example, a single onboard controller may control two or more of chassis 102, conveyor 104, enabler joint assembly 108, 110, and/or robotic arm 106 and end effector 112. For example, in some embodiments, a single onboard controller may control the enabler joint assembly 108, 110 and robotic arm 106.

Figure 1B:
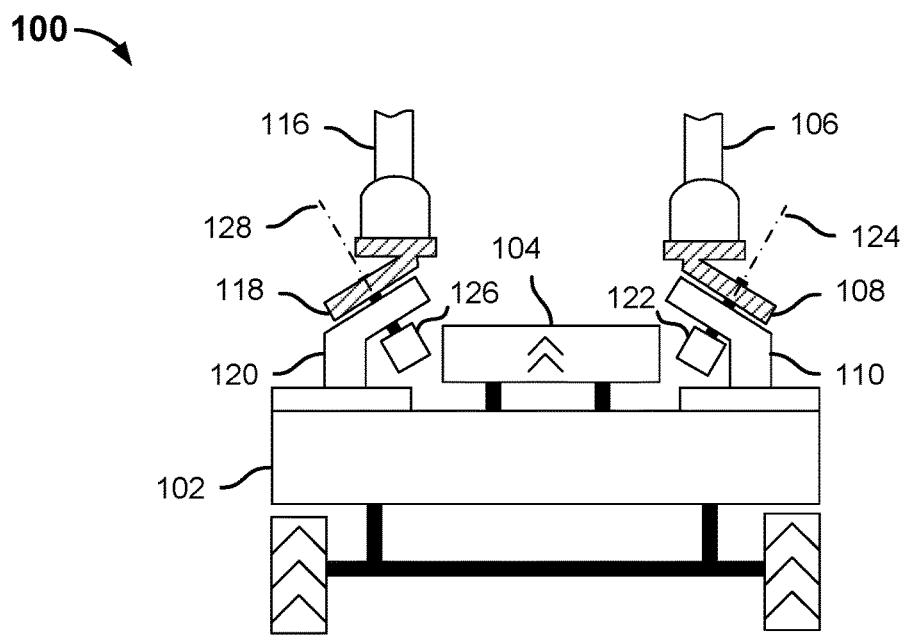
FIG. 1B is a diagram illustrating an embodiment of a robotic system comprising a robotic arm and a robotically controlled enabler joint.

FIG. 1B is a diagram illustrating an embodiment of a robotic system comprising a robotic arm and a robotically controlled enabler joint. Specifically, a rear view of the robotic system 100 of FIG. 1A is shown. In the example shown, robotic arm 106 is shown to be mounted to transfer plate 108 in a manner such that a mounting location portion of transfer plate 108 is in a plane substantially parallel to the ground, in the neutral or center position as shown in FIG. 1B. The mounting location portion is connected to a body portion that is oriented at a tilt angle, as shown, that corresponding to tilt angle of the upper portion of enabler joint base 110. An enabler joint motor 122 is mounted below enabler joint base 110, i.e., on the side opposite the transfer plate 108. Enabler joint motor 122 has a shaft that extends through the enabler joint base 110 in a manner that allows the shaft of enabler joint motor 122 to rotate freely relative to the enabler joint base 110. The shaft of enabler joint motor 122 is coupled mechanically to the transfer plate 108, which enables to enabler joint motor 122 to be operated, under robotic control, to rotated the transfer plate 108 about a enabler joint axis of rotation 124 of the enabler joint assembly 108, 110, 120.

In the example shown in FIG. 1B, the robotic system 100 includes a second robotic arm 116 mounted on the left side of the conveyor 104 (as shown), opposite the first robotic arm 106. The robotic arm 116 is mounted on an enabler joint assembly that includes a transfer plate 118, enabler joint base 120, and enabler joint motor 126 and associated axis of rotation 128, having geometry, structures, and arrangements that substantially mirror the corresponding elements comprising the enabler joint assembly 108, 110, 120 on which the robotic arm 106 is mounted.

In various embodiments, the robotic arms 106, 116 and their respective enabler joint assemblies may be operated simultaneously, alternatingly, and/or jointly to pick and place items from conveyor 104 to a destination (e.g., palletization or truck loading) and/or from a source to place them on conveyor 104 (e.g., depalletization or truck unloading). For example, the robotic arms 106, 116 may be used singly, but in a manner coordinated by control computer 114, to pick and place items one by one from the conveyor 104 to corresponding destinations, e.g., on a pallet or in a truck or other container. In some embodiments, the robotic arms 106, 116 may be used together to cooperatively pick and place a single item, such as a large and/or heavy box or other item.

Figure 2A:
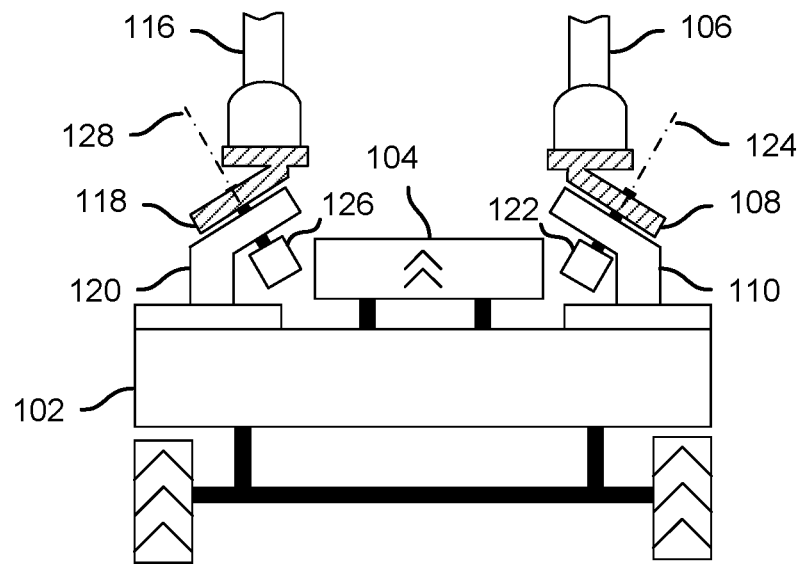
FIG. 2A is a diagram illustrating an embodiment of a robotic system comprising a robotic arm and a robotically controlled enabler joint.

FIG. 2A is a diagram illustrating an embodiment of a robotic system comprising a robotic arm and a robotically controlled enabler joint. In the example shown, the transfer plates 108 and 118 are both in a neutral or center position. In the embodiment shown, the transfer plates 108 and 118 being in the neutral center position results in the respective bases of the robotic arms 106 and 116 being in a plane parallel to the ground, as a result of the geometry of the transfer plates 108 and 118. Specifically, the respective mounting locations of the transfer plates 108 and 118 are parallel to the ground.

Figure 2B:
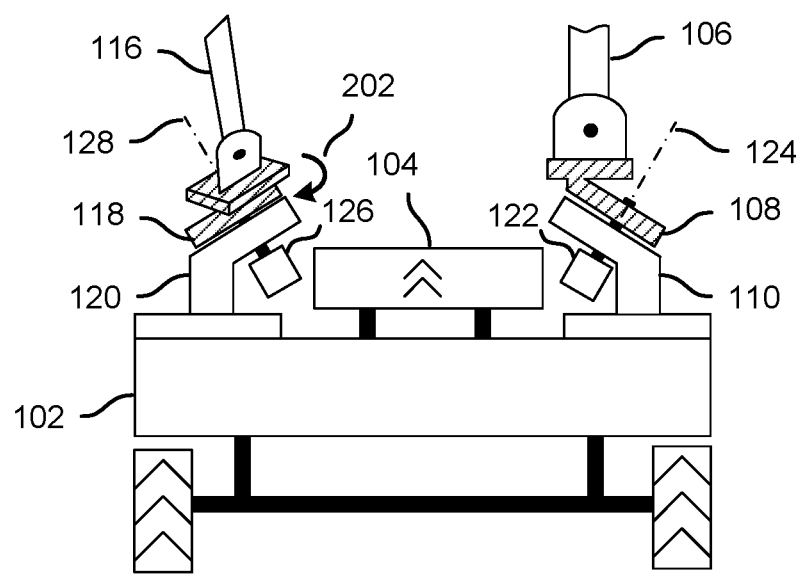
FIG. 2B is a diagram illustrating an embodiment of a robotic system comprising a robotic arm and a robotically controlled enabler joint.

FIG. 2B is a diagram illustrating an embodiment of a robotic arm and a robotically controlled enabler joint. In the state shown in FIG. 2B, transfer plate 118 has been rotated back about the axis 128, in the direction indicated by arrow 202, by operation of motor 126. The mounting location of transfer plate 118 has, as a result, tilted back and a little away from conveyor 104. In some embodiments, the mounting location and the base of robotic arm 116 mounted thereon follow an elliptic path, as a result of the mounting location (e.g., the geometric center of the mounting location and/or base) being offset both radially and vertically (i.e., in the direction of the axis 128) from the point on axis 128 at which the transfer plate is coupled mechanically to the shaft of motor 126 and the acute (non-zero, non-right) angle at which the axis 128 is oriented relative to the vertical.

In various embodiments, the characteristic described in the preceding paragraph, by which the transfer plate 118 and robotic arm 116 move both back and away from conveyor 104 is used advantageously by a robotic control system, as disclosed herein. For example, the system may determine to rotate one or both of the transfer plates 108 and 118 and associated robotic arms 106 and 116 back (or forward) and outward, e.g., to make room for a wide box or other item to pass between them and/or to be able to use both robotic arms 106 and 116 together, in cooperation, to grasp a large box. For example, by swinging the arms slightly outward, the robotic arms 106 and 116 may be able to grasp the item jointly using a more favorable pose and/or approach, such as one that avoids control singularities or poses that are awkward or hard to achieve or recover from, or to avoid collisions.

Figure 3A:
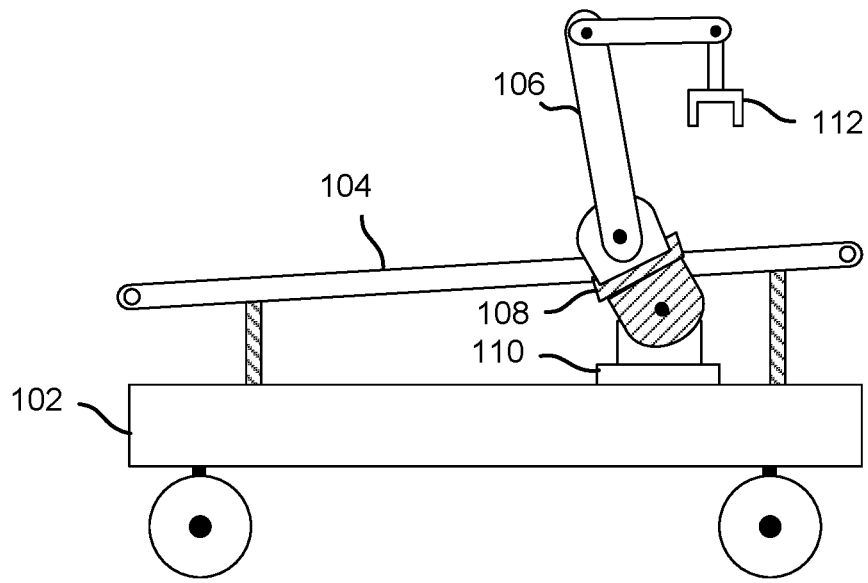
FIG. 3A is a diagram illustrating an embodiment of a robotic system comprising a robotic arm and a robotically controlled enabler joint.

FIG. 3A is a diagram illustrating an embodiment of a robotic system comprising a robotic arm and a robotically controlled enabler joint. In the example shown, the transfer plate 108 has been rotated back, resulting in the robotic arm 106 being positioned both further back and further out, relative to conveyor 104. In various embodiments, using the enabler joint 108, 110 to position the robotic arm 106, as shown, may enable the robotic arm 106 to be used to grasp (or place) an item further back on conveyor 104. Such a capability may make it possible to simultaneously or nearly simultaneously use robotic arm 116, for example, to grasp (or place) an item at a location further to the right of conveyor 104, as shown. In addition, in the position shown in FIG. 3A, robotic arm 106 may be in a better position to grasp (or place) an item from (or at) a location near the front of chassis 102 on the same side as the robotic arm 106.

Figure 3B:
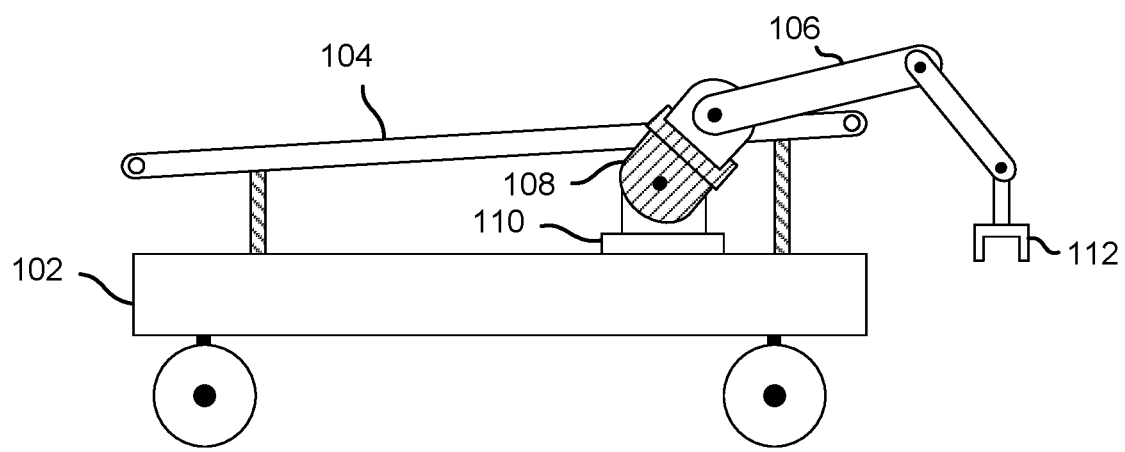
FIG. 3B is a diagram illustrating an embodiment of a robotic system comprising a robotic arm and a robotically controlled enabler joint.

FIG. 3B is a diagram illustrating an embodiment of a robotic system comprising a robotic arm and a robotically controlled enabler joint. In the example shown, transfer plate 108 has been rotated forward, into the position as shown. In various embodiments, using the enabler joint 108, 110 to tilt robotic arm 106 forward and slightly outward, as shown, may enable the robotic arm to reach/place items at a greater height and/or at a further distance from the chassis 102, or to reach across the front of chassis 102 to pick/place an item at a location near the front of chassis 102 on the side opposite robotic arm 106.

Figure 4A:
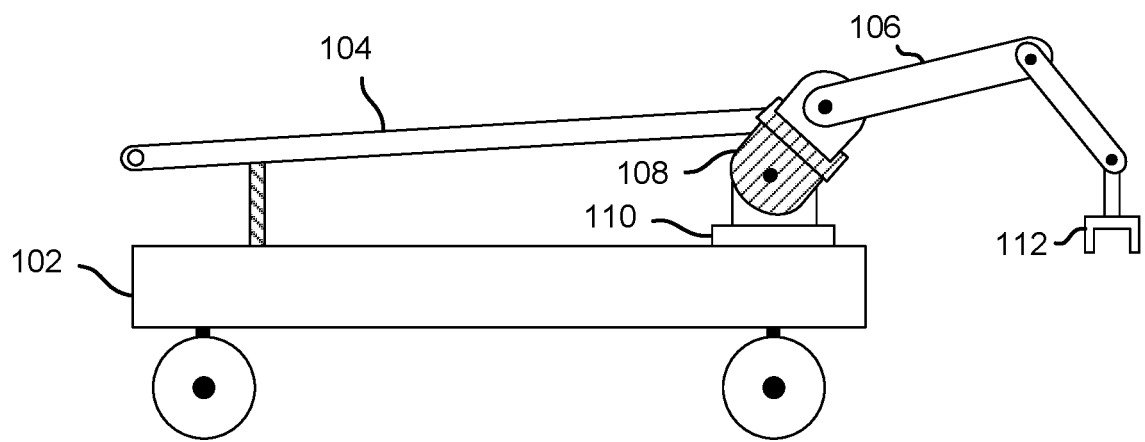
FIG. 4A is a diagram illustrating an embodiment of a robotic system comprising a robotic arm and a robotically controlled enabler joint.

FIG. 4A is a diagram illustrating an embodiment of a robotic system comprising a robotic arm and a robotically controlled enabler joint. In the example shown, transfer plate 108 has been rotated forward, into the position as shown in FIG. 3B.

Figure 4B:
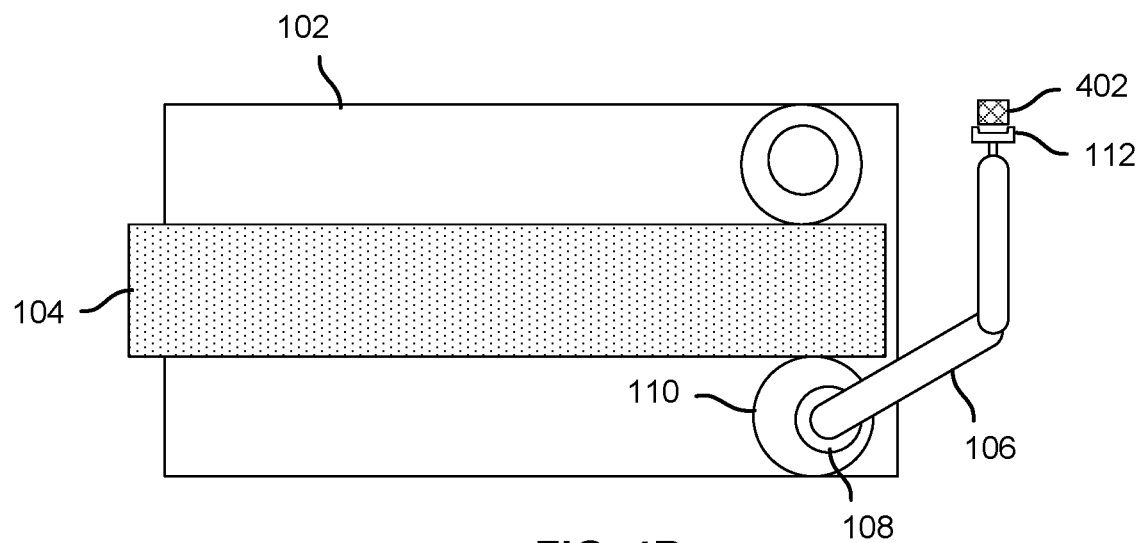
FIG. 4B is a diagram illustrating an embodiment of a robotic system comprising a robotic arm and a robotically controlled enabler joint.

FIG. 4B is a diagram illustrating an embodiment of a robotic system comprising a robotic arm and a robotically controlled enabler joint. In FIG. 4B, a top view of the robotic system with the robotic arm 106 tilted forward is shown. In the example shown, the resulting positioning of robotic arm 106 is being used to reach across the front of chassis 102 to pick/place an item 402 at a location near the front of chassis 102 at the side opposite robotic arm 106.

Figure 5A:
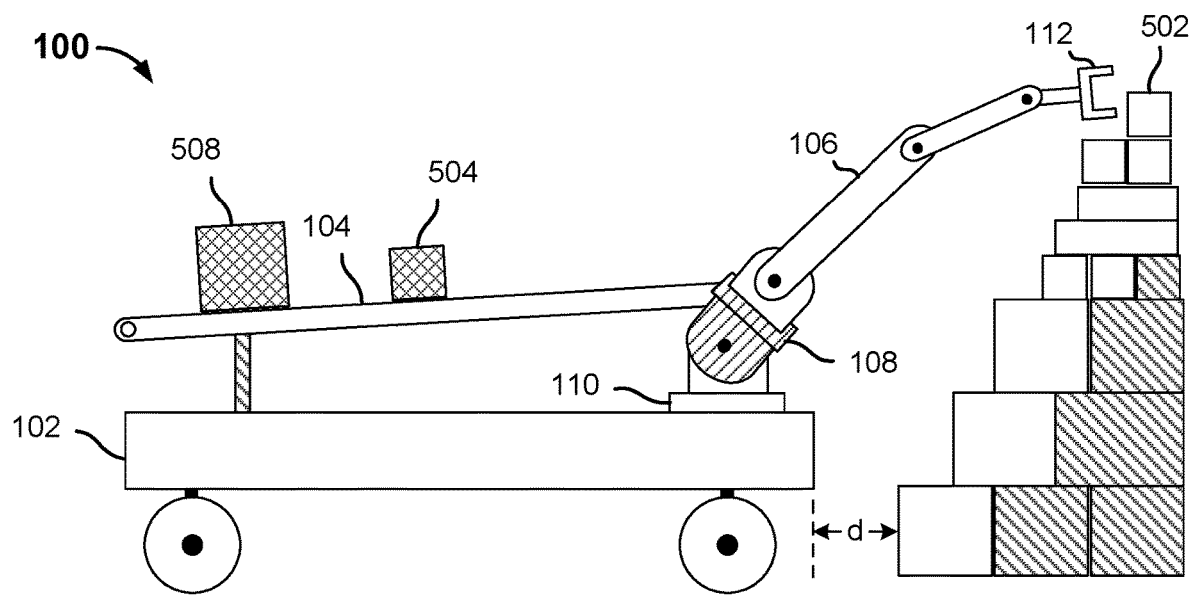
FIG. 5A is a diagram illustrating an embodiment of a robotic system comprising a robotic arm and a robotically controlled enabler joint.

FIG. 5A is a diagram illustrating an embodiment of a robotic system comprising a robotic arm and a robotically controlled enabler joint. In the example shown, transfer plate 108 has been rotated forward and robotic arm 106 extended up and relatively far forward of chassis 102, e.g., to pick/place item 502 at the very top of the stacked boxes as shown. In various embodiments, a robotic control system, e.g., control computer 114 of FIG. 1A, controls the robotically controlled instrumentalities of the robotic system, e.g., one or more of chassis 102, conveyor 104, robotic arm 106, enabler joint 108, 110, and end effector 112.

Image or other sensor data may be received an provided to a vision or perception system configured to generate a three dimensional view of at least relevant portions of the workspace. The control computer may advance chassis 102, e.g., to the position as shown in FIG. 5A; advance conveyor 104, e.g., to move items 504, 508 into position to be picked/placed, and may operation robotic arm 106, enabler joint 108, 110, and end effector 112 to perform tasks associated with a higher level objective. For example, in the example shown in FIG. 5A, the control computer may have positioned the chassis 102 as shown, advanced conveyor 104 to put item 502 in a location from which robotic arm 106 could be used to pick and place it into the position shown. The control computer may have operated robotic arm 106 and enabler joint 108, 110 synchronously to grasp the item 502 using robotic arm 106 and move the item 502 to the position shown, by a seamless, fluid, and at least partly concurrent movement of the enabler joint 108, 110 and elements comprising the robotic arm 106.

In various embodiments, the control computer may be configured, e.g., by training, machine learning, artificial intelligence, heuristics, and other technologies, singly or in combination, to determine a higher level plan to stack the items as shown. For example, to load items into a truck or other container large enough for the robotic system 100 to drive and/or reach into, the control computer may device a plan to build the stack as shown by forming successive staggered layers of items, like stairs, as shown in FIG. 5A. For example, the boxes shown in crosshatch may have been placed first, followed by the chassis 102 being backed out to the position shown, enabling the boxes not filled with crosshatch to be placed as shown. Having placed item 502 at the very top of the stack, in this example, the control computer may back the chassis 102 further away from the stack, e.g., to enable arriving items 504, 508 to be used to form the next set of "stairs".

Figure 5B:
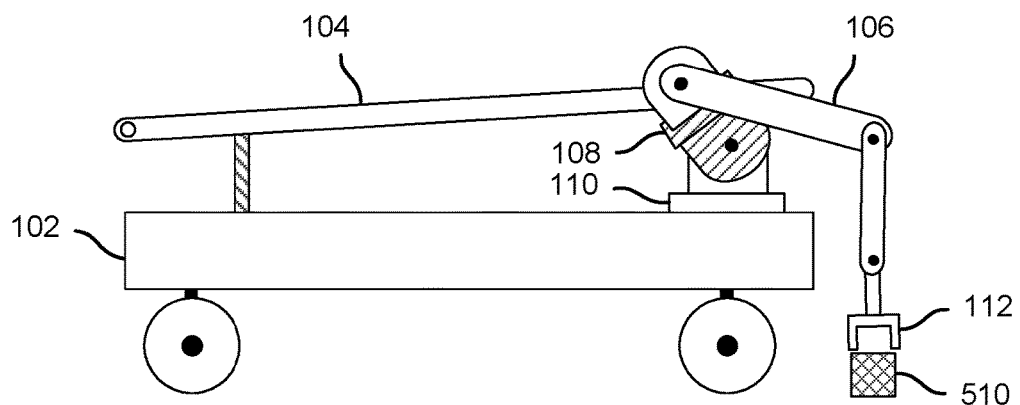
FIG. 5B is a diagram illustrating an embodiment of a robotic system comprising a robotic arm and a robotically controlled enabler joint.

FIG. 5B is a diagram illustrating an embodiment of a robotic system comprising a robotic arm and a robotically controlled enabler joint. In the example shown, transfer plate 108 and robotic arm 106 have been rotated back (and outward from conveyor 104), enabling item 510 to be picked or placed at the location shown, near the front of chassis 102 on the same side as robotic arm 106.

Figure 6A:
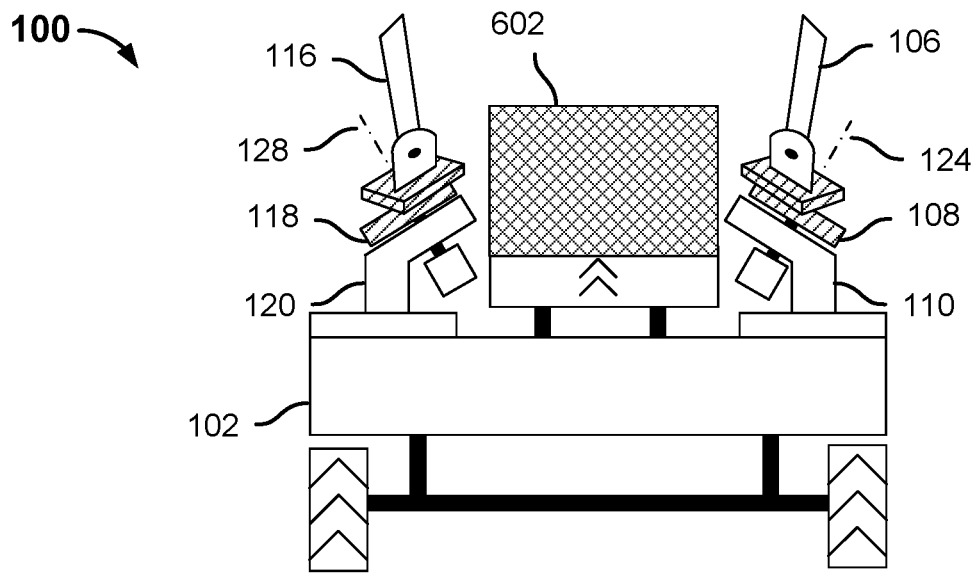
FIG. 6A is a diagram illustrating an embodiment of a robotic system comprising a robotic arm and a robotically controlled enabler joint.

FIG. 6A is a diagram illustrating an embodiment of a robotic system comprising a robotic arm and a robotically controlled enabler joint. In the example shown, both transfer plate 108 and robotic 106 and transfer plate 118 and robotic arm 116 have been rotated back and, as a result, slightly outward. As result, a greater width of space is made available for item 602 to pass between the transfer plate 108 and robotic 106, on one side, and transfer plate 118 and robotic arm 116 on the other side.

In various embodiments, vision, label scanning, laser or other light sensors, or other sensors may be used to detect that an item requiring greater clearances must pass between the enabler joints and/or robotic arms, and in response the control computer places the enabler joints and robotic arms in the positions as shown in FIG. 6A.

Figure 6B:
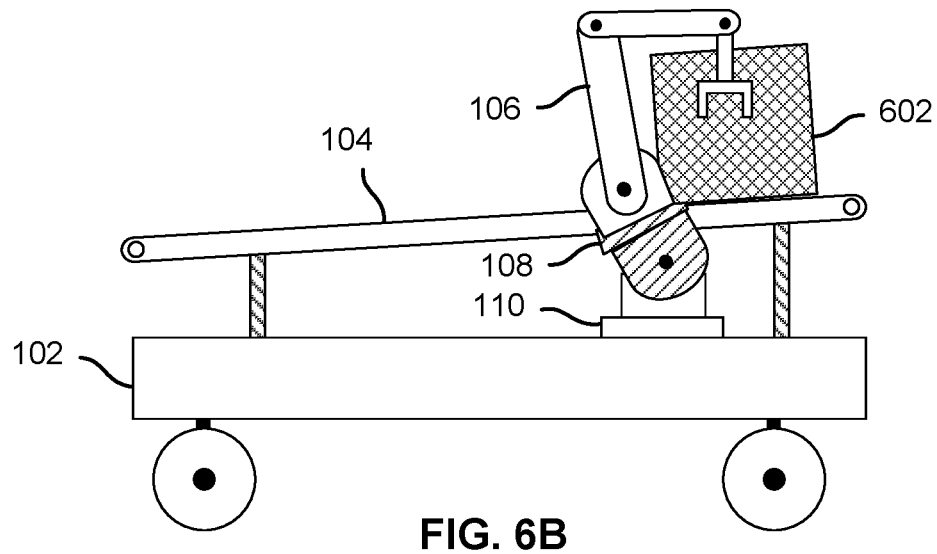
FIG. 6B is a diagram illustrating an embodiment of a robotic system comprising a robotic arm and a robotically controlled enabler joint.

FIG. 6B is a diagram illustrating an embodiment of a robotic system comprising a robotic arm and a robotically controlled enabler joint. Specifically, the robotic system 100 configured as shown in FIG. 6A is shown from a side view. The view shown in FIG. 6B illustrates that rotating the enabler joints and robotic arms back may facilitate cooperative, dual robot picking and placing of the item 602. For example, robotic arm 106 is able to be positioned in a non-awkward pose to place its end effector 112 at a central location on the near (to robotic arm 106) side of item 602.

Figure 6C:
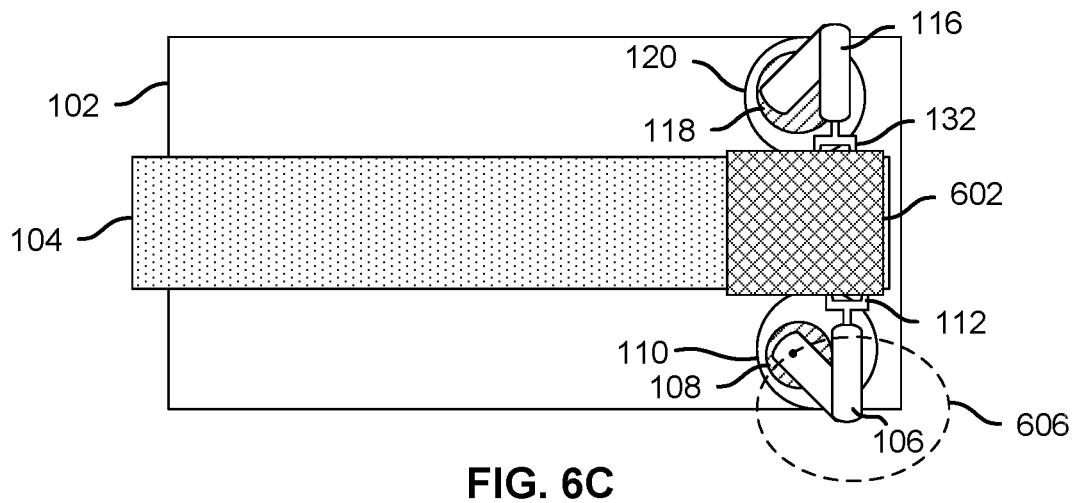
FIG. 6C is a diagram illustrating an embodiment of a robotic system comprising a robotic arm and a robotically controlled enabler joint.

FIG. 6C is a diagram illustrating an embodiment of a robotic system comprising a robotic arm and a robotically controlled enabler joint. Specifically, the robotic system 100 configured as shown in FIG. 6A is shown from a top view. The view shown in FIG. 6C illustrates how using the enabler joints 108, 110 and 118, 120 to position the robotic arms 106, 116 back and slightly outward facilitates cooperative, dual robot picking and placing of the item 602.

In FIG. 6C, ellipse 606 illustrates the elliptic path the base of robotic arm 106 may follow as the enabler joint 108, 110 is rotated back or forward, from the center/neutral position at which it is closest to conveyor 104.

Figure 7A:
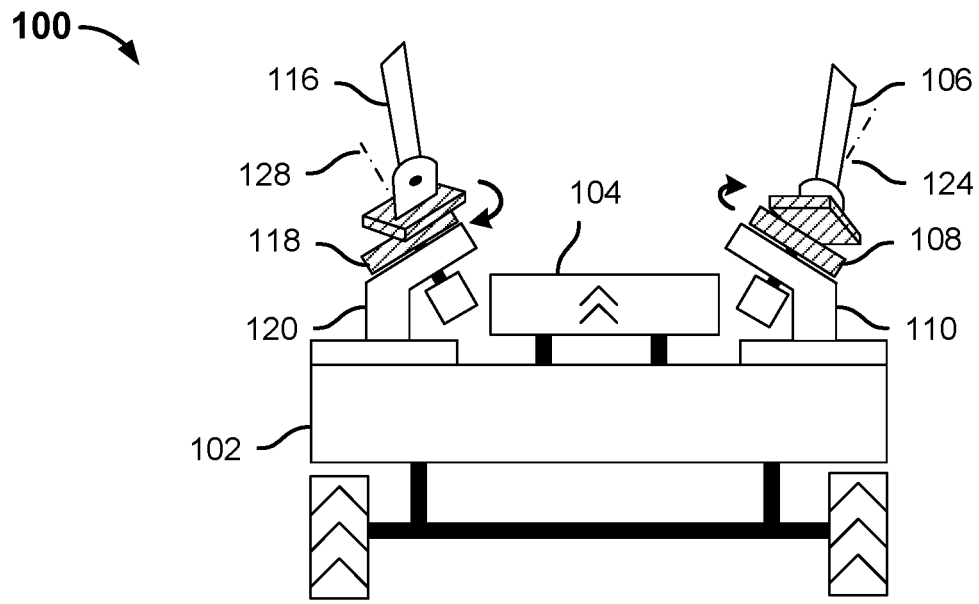
FIG. 7A is a diagram illustrating a rear view of an embodiment of a robotic system comprising a robotic arm and a robotically controlled enabler joint.

FIG. 7A is a diagram illustrating a rear view of an embodiment of a robotic system comprising a robotic arm and a robotically controlled enabler joint. In the example shown, enabler joint 108, 110 and robotic arm 106 have been rotated forward and enable joint 118, 120 and robotic arm 116 have been rotated back. In various embodiments, rotating one arm forward and the other back has an effect similar to a human worker turning their shoulders toward a task.

Figures 7B, 7C:
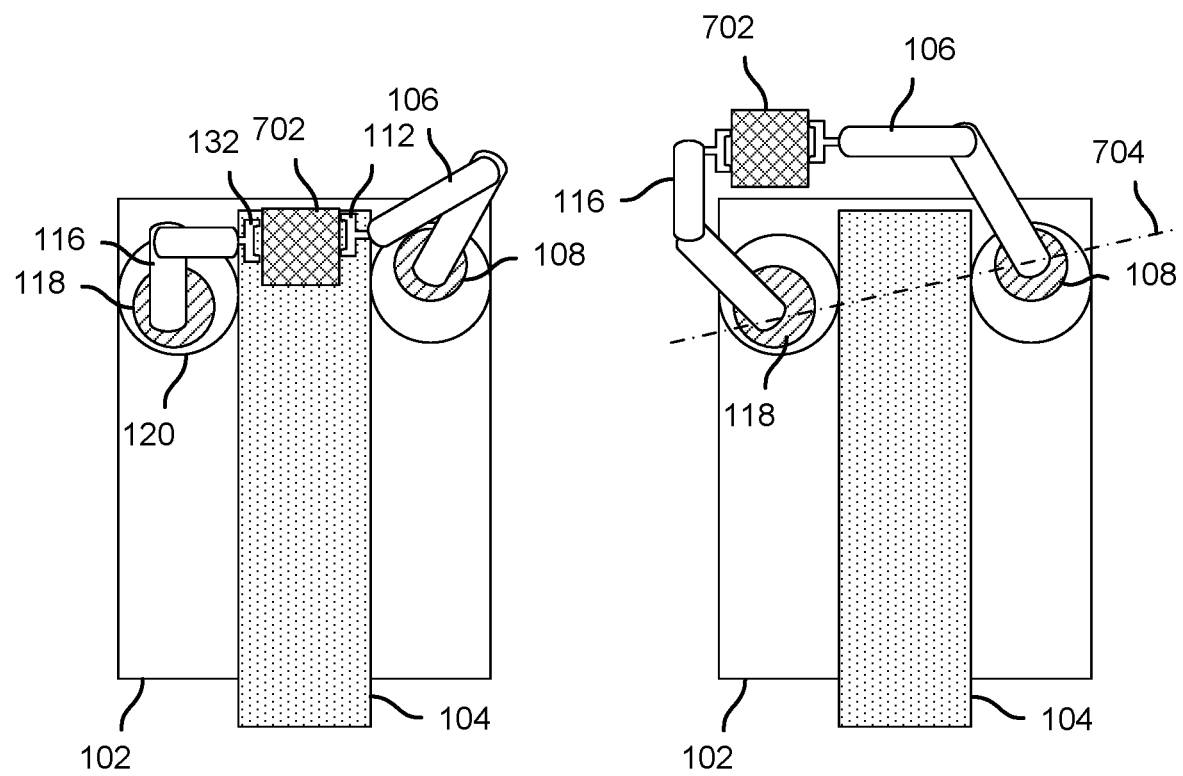
FIG. 7B is a diagram illustrating a top view of an embodiment of a robotic system comprising a robotic arm and a robotically controlled enabler joint.
FIG. 7C is a diagram illustrating a top view of an embodiment of a robotic system comprising a robotic arm and a robotically controlled enabler joint.

FIG. 7B is a diagram illustrating a top view of an embodiment of a robotic system comprising a robotic arm and a robotically controlled enabler joint. In the example shown, the enabler joint 108, 110 and robotic arm 106 have been rotated forward and the enabler joint 118, 120 and robotic arm 116 have been rotated back, as in FIG. 7A. The robotic arms 106, 116 have been used to cooperatively grasp and lift item 702 from conveyor 104.

FIG. 7C is a diagram illustrating a top view of an embodiment of a robotic system comprising a robotic arm and a robotically controlled enabler joint. In the example shown, rotation forward of enabler joint 108, 110 and robotic arm 106 and back of enabler joint 118, 120 and robotic arm 116 has had an effect similar to a human worker turning their shoulders to perform a task, as indicated by the line 704 passing through the repositioned bases of the robotic arms 106, 116. If both enabler joints (108, 110 and 118, 120) were in the center/neutral position, the line between the bases would be parallel to the front edge of chassis 102. However, by rotating enabler joint 108, 110 and robotic arm 106 forward while rotating enabler joint 118, 120 and robotic arm 116 back, as shown, the robotic arms 106, 116 are better able to move and place the item 702 to the location shown, without the robotic arm 116 having to be placed in an awkward or weak pose, for example, or having robotic arm 116 contact a side wall of a truck or other obstacle or constraint in the workspace.

In some embodiments, the control computer may be programmed or configured to perform a cooperative pick and place as shown in FIGS. 7A through 7C. In some embodiments, the control computer may learn to perform such a maneuver, including the advantage or utility of rotating one robotic arm forward and the other back. For example, the system could observe as a human operator operates the robotic system 100 in various manners to perform different tasks under dynamic conditions. The control computer may learn from such observation strategies that are likely, under given conditions, to result in a successful pick and place.

Figure 8A:
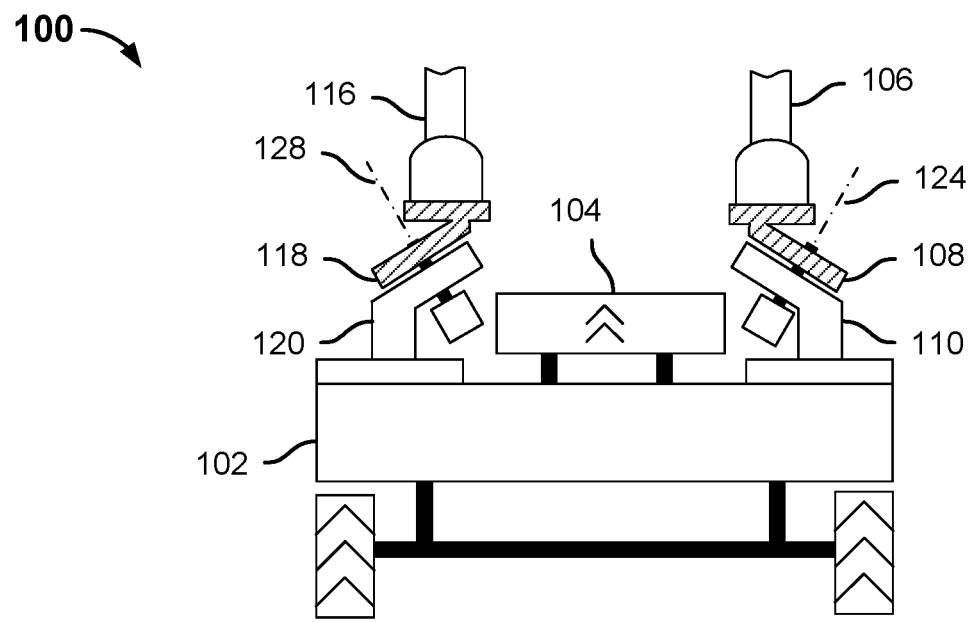
FIG. 8A is a diagram illustrating an embodiment of a robotic system comprising a robotic arm and a robotically controlled enabler joint.

FIG. 8A is a diagram illustrating an embodiment of a robotic system comprising a robotic arm and a robotically controlled enabler joint. In the example shown, the enabler joint 108, 110 and robotic arm 106 and enabler joint 118, 120 and robotic arm 116 are in the center/neutral position. Given the geometry of the transfer plates 108, 118 and the angle at which the rotational axes 124 and 128, the positions of the enabler joints (108, 110 and 118, 120) as shown in FIG. 8A results in the mounting location to which the respective bases of the robotic arms 106, 116 are mounted being substantially parallel to the ground, i.e., in the same up and down orientation if the robotic arms 106, 116 had been mounted directly to the top of chassis 102.

Figure 8B:
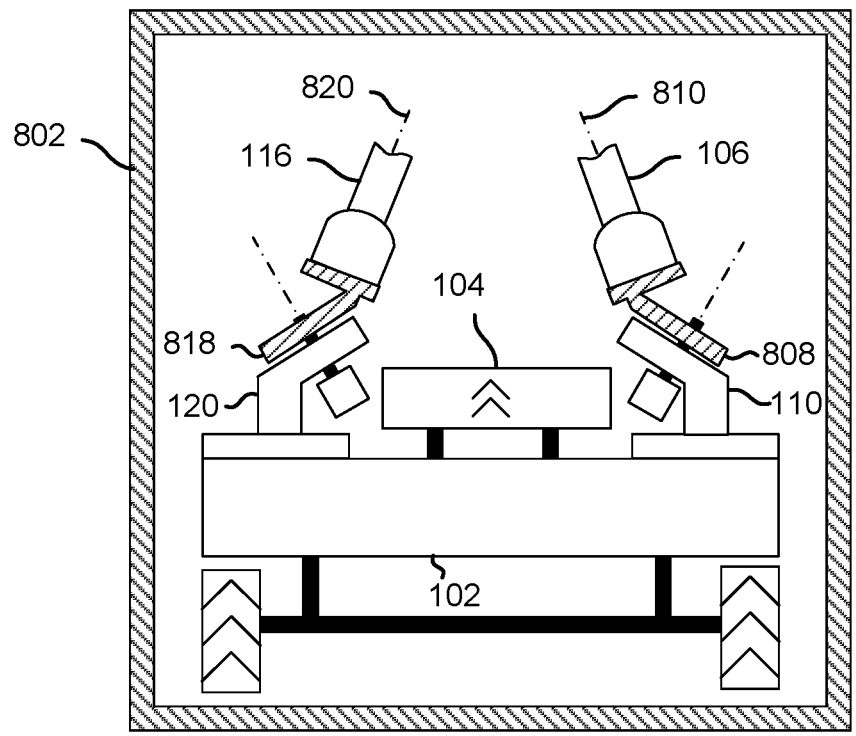
FIG. 8B is a diagram illustrating an embodiment of a robotic system comprising a robotic arm and a robotically controlled enabler joint.

FIG. 8B is a diagram illustrating an embodiment of a robotic system comprising a robotic arm and a robotically controlled enabler joint. In the example shown, the geometry of the transfer plates 808 and 818 is different than the geometry of the corresponding structures (transfer plates 108, 118) of FIG. 8A, resulting in the robotic arms 106, 116 being tilted inward, toward conveyor 104, when the enabler joints (808, 110 and 818, 120) are in the center/neutral positions.

In FIG. 8B, the robotic system is shown to be deployed inside a truck or shipping container 802. In this example, use of transfer plates 808, 818 which result in the robotic arms 106, 116 being tilted slightly inward, towards conveyor 104, may make it easier for the robotic arms 106, 116 to be used to pick/place items from/to conveyor 104 to/from truck or container 802 without risking a collision with the sidewall of truck or container 802.

In various embodiments, a custom or off the shelf transfer plate may be made or selected and the control computer configured or programmed to control the enabler joints and robotic arms in light of the geometry of the transfer plates. In some embodiments, the orientation of the enabler joint axes 124, 128 similarly may be varied, and the control computer adapted to control the enabler joints and robotic arms accordingly.

Figure 9A:
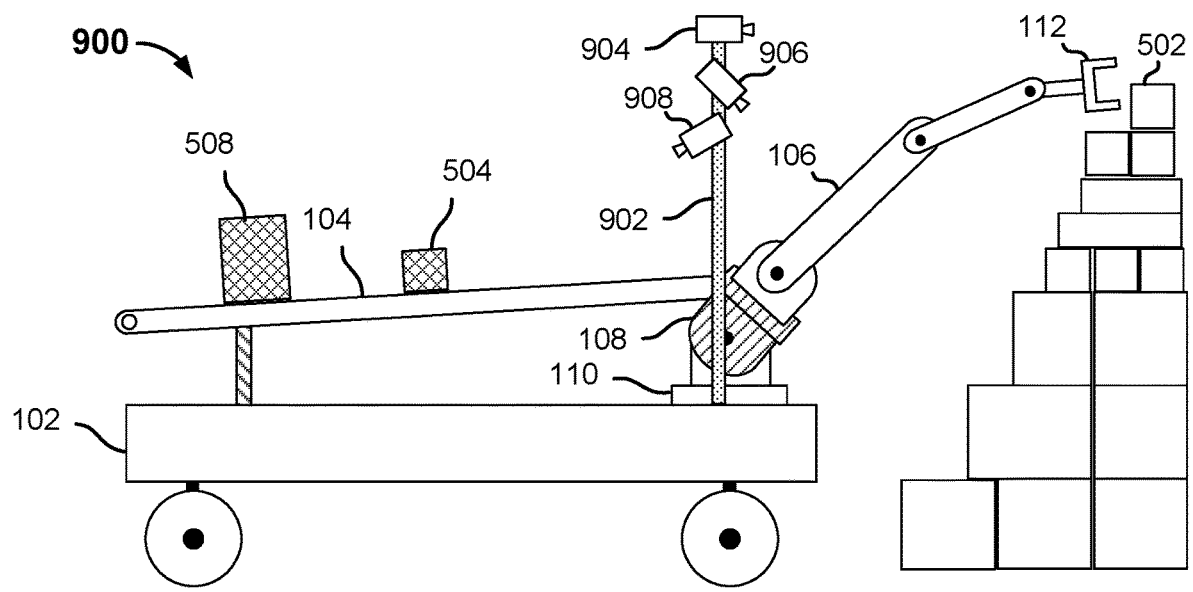
FIG. 9A is a diagram illustrating an embodiment of a robotic system comprising a robotic arm and a robotically controlled enabler joint.

FIG. 9A is a diagram illustrating an embodiment of a robotic system comprising a robotic arm and a robotically controlled enabler joint. In the example shown, robotic system 900 includes the elements of robotic system 100 of FIG. 1A and following, and in addition includes a mounting pole or boom 902 on which cameras 904, 906, and 908 are mounted, to provide views of a stack being built by the robotic system 900, an area in front of and at the foot of the chassis 102, and items (e.g., 504, 508) arriving via conveyor 104.

In various embodiments, a control computer, such as control computer 114 of FIG. 1A, uses image data from the cameras 904, 906, and 908 to create and implement a plan to pick and place items arriving via conveyor 104. The image data from camera 908 may be used, for example, to determine the size, weight, and/or other attributes of items arriving via conveyor 104. The attributes may be used to determine a strategy to grasp, move, and/or place the respective items.

In the example shown in FIG. 9A, the enabler joint 108, 110 and robotic arm 106 are tilted forward, and the robotic arm 106 is being used to place the item 502 at the far back and top of the stack as shown. Images provided by camera 904 may be used, for example, to select the location to place item 502, place the item 502, and/or verify the position of item 502 and/or stability of the stack after placing item 502.

Figure 9B:
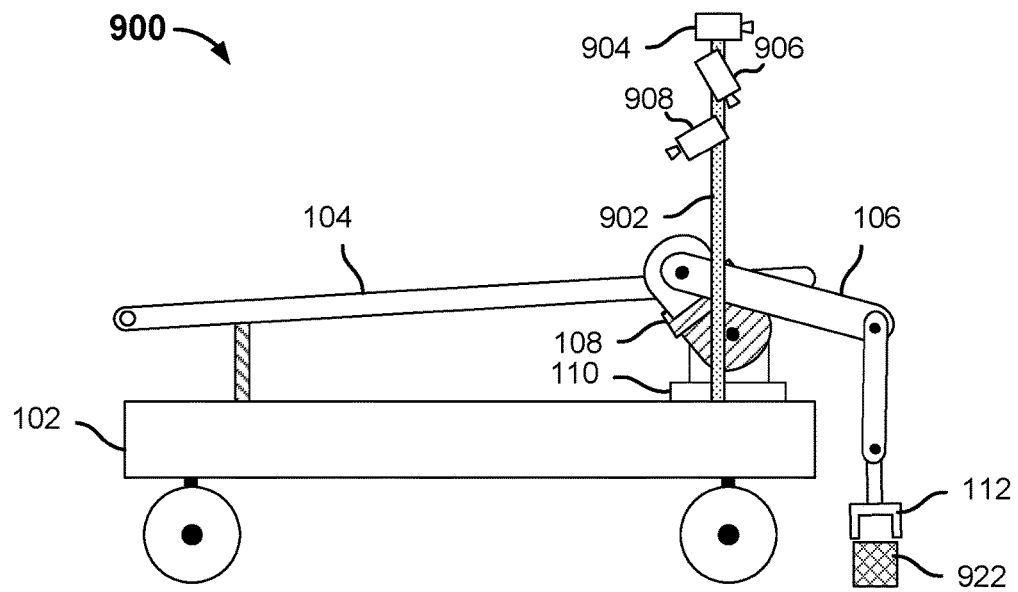
FIG. 9B is a diagram illustrating an embodiment of a robotic system comprising a robotic arm and a robotically controlled enabler joint.

FIG. 9B is a diagram illustrating an embodiment of a robotic system comprising a robotic arm and a robotically controlled enabler joint. In the example shown, the enabler joint 108, 110 and robotic arm 106 have been tilted back, and the robotic arm 106 is being used to pick or place the item 922 at a location on the ground very near the front of chassis 102. In various embodiments, images from downward looking camera 906 may be used to select the placement location and/or the item 922 to be picked/placed and/or to perform the pick/place task and/or assess a result of the task.

Figure 9C:
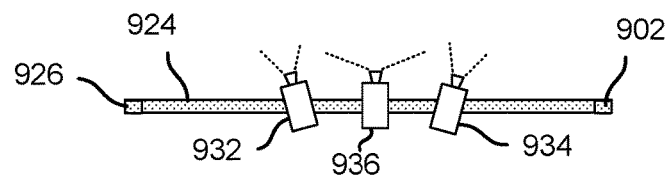
FIG. 9C is a diagram illustrating an embodiment of a robotic system comprising a robotic arm and a robotically controlled enabler joint.

FIG. 9C is a diagram illustrating an embodiment of a robotic system comprising a robotic arm and a robotically controlled enabler joint. In the example shown, pole 902 of FIGS. 9A and 9B is shown to support one end of a cross member 924, which is supported at the opposite end by pole 926. Forward looking cameras 932 and 934 provide a view of the upper region of a work area in front of robotic system 900, such as the stack shown in FIG. 9A. A downward looking camera 936 provides a view of the ground in front of the robotic system 900, e.g., immediately in front of chassis 102, as in the example shown in FIG. 9B.

Downward looking camera 936 is shown to have a wider field of view than the forward-looking cameras, 932, 934, which enables the ground in front of the chassis 102 to be viewed with a single camera.

In various embodiments, three dimensional cameras are used to provide both 2D image (e.g., RGB) and depth information (depth pixels or "point cloud"), to enable a three-dimensional view of the workspace to be constructed.

Figure 10A:
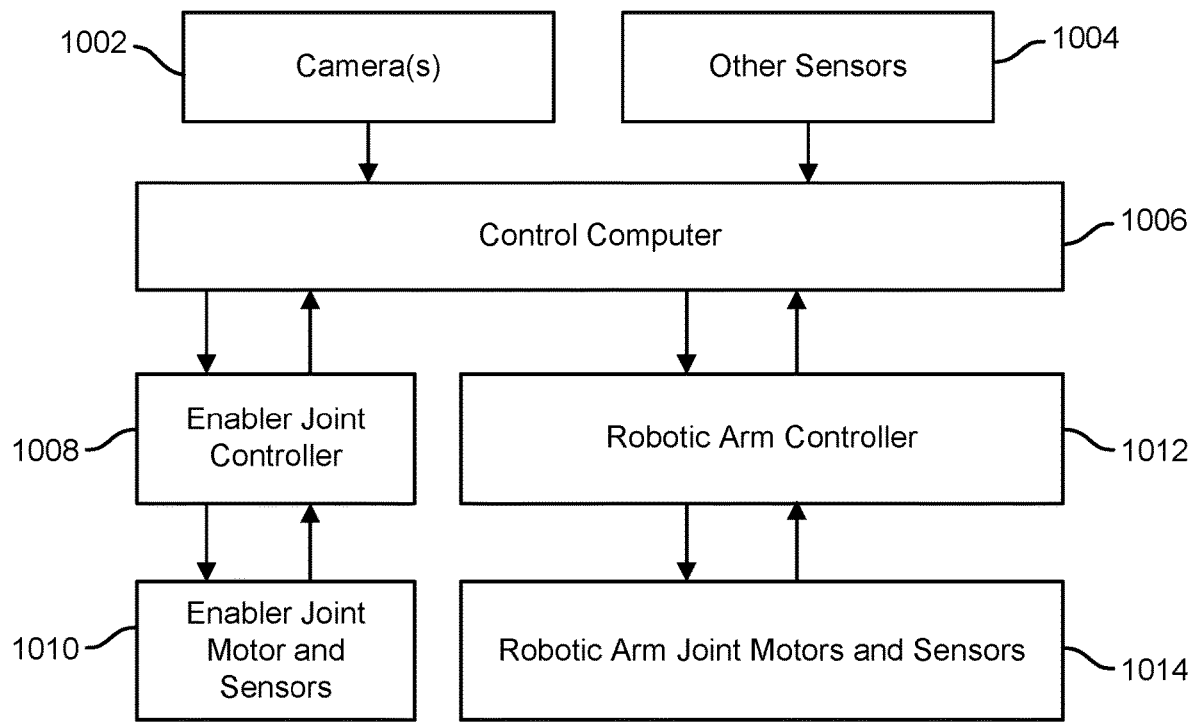
FIG. 10A is a block diagram illustrating an embodiment of a control architecture of a robotic system having a robotic arm and a robotically controlled enabler joint.

FIG. 10A is a block diagram illustrating an embodiment of a control architecture of a robotic system comprising a robotic arm and a robotically controlled enabler joint. In the example shown, cameras 1002 and (optionally) other sensors 1004 provide input to a control computer 1006, e.g., control computer 114 of FIG. 1A. In the example shown, the control computer 1006 sends commands to an enabler joint controller 1008, to control one or more enabler joints, and separately but in coordination sends commands to robotic arm controller 1012. Enabler joint controller 1008 sends lower level (e.g., torque) commands to enabler joint motor controllers 1010, and sensors on or associated with the enabler joint and/or enabler joint motor send feedback signals (e.g., position, temperature) back up to the control computer 1006 via the enabler joint controller 1008. Similarly, the robotic arm controller 1012 sends lower-level commands to joint motor controllers comprising the robotic arm, which in turn supply current to the respective joint motors 1014 to move the robotic arm and its constituent elements in a manner calculated to perform a given task, such as a pick/place task or portion thereof. Likewise, sensor information from or associated with the joint motors may be fed back up to the control computer 1006 via the robotic arm controller 1012.

In various embodiments, the control system and architecture shown in FIG. 10A may enable an off-the-shelf robotic arm having an associated robotic arm controller configured to be used to control and operate the robotic arm to be used, and for an enabler joint and associated controller to be obtained, e.g., from a third party vendor, and used in an integrated manner, as disclosed herein, to operate the robotic arm through an extended operating space defined at least in part by the n degrees of freedom of the robotic arm and an $(n+1)^{th}$ degree of freedom provided by the enabler joint.

Figure 10B:
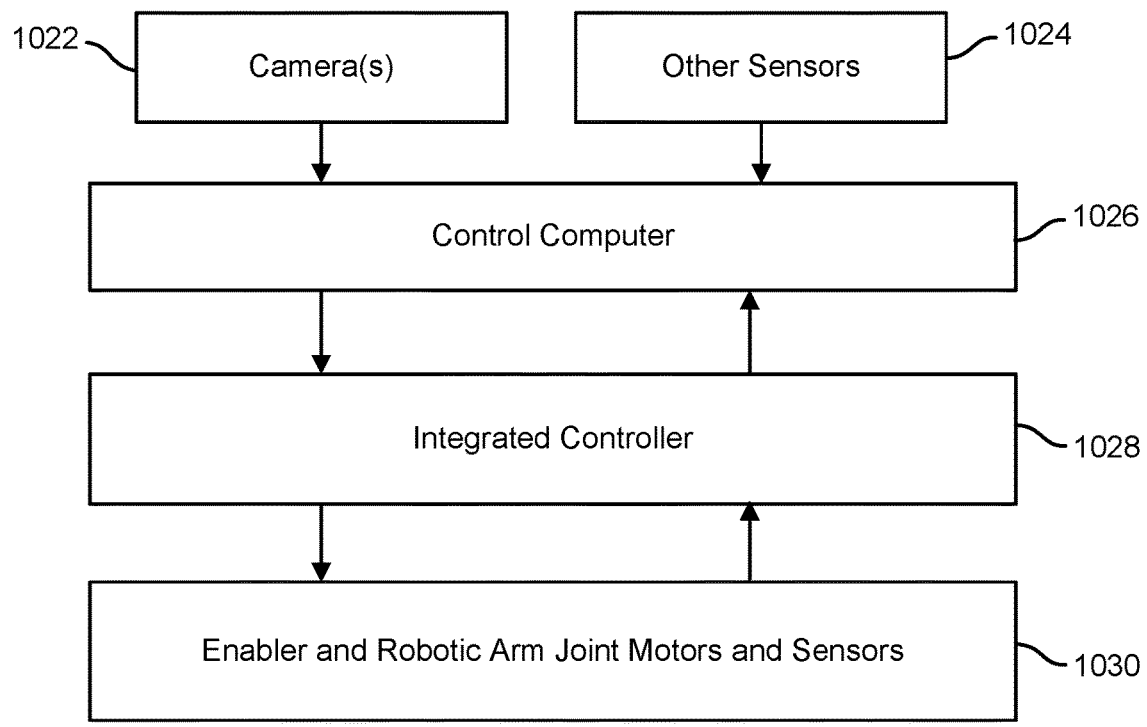
FIG. 10B is a block diagram illustrating an embodiment of a control architecture of a robotic system having a robotic arm and a robotically controlled enabler joint.

FIG. 10B is a block diagram illustrating an embodiment of a control architecture of a robotic system comprising a robotic arm and a robotically controlled enabler joint. In the example shown, cameras 1022 and (optionally) other sensors 1024 provide input to a control computer 1026. The control computer 1026 sends commands to an integrated controller 1028 that is configured to control both the enabler joint(s) and the robotic arm(s), e.g., by sending commands to the respective motor controllers 1030 associated with the enabler joint and the joints of the robotic arm. As in the example in FIG. 10A, the motors may include or have associated with them sensors, the output of which may be passed up to the control computer 1026 via the integrated controller 1028.

Figure 11:
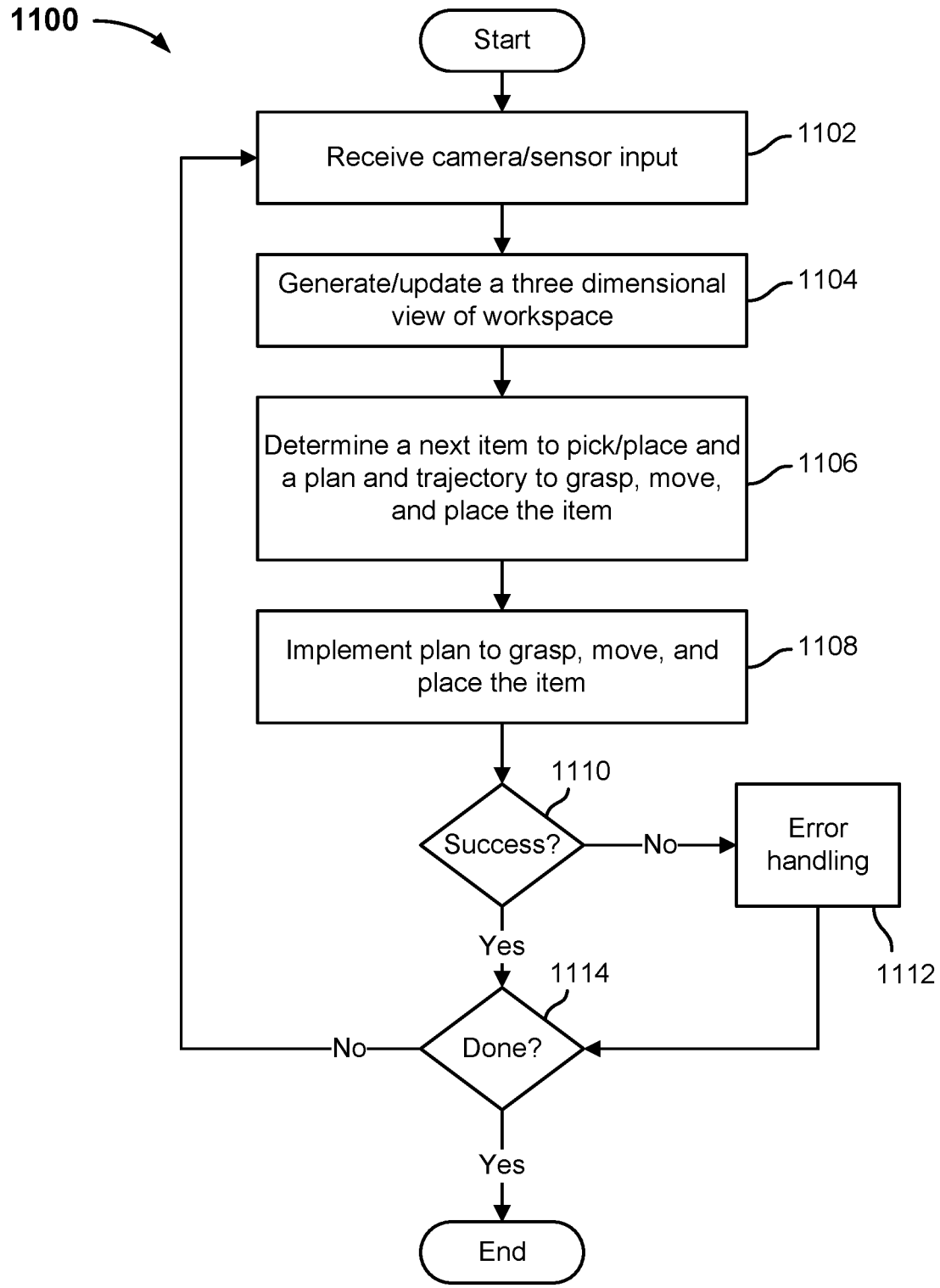
FIG. 11 is a flow diagram illustrating an embodiment of a process to control a robotic system comprising a robotic arm and a robotically controlled enabler joint.

FIG. 11 is a flow diagram illustrating an embodiment of a process to control a robotic system comprising a robotic arm and a robotically controlled enabler joint. In various embodiments, the process 1100 of FIG. 11 is performed by a control computer, such as control computer 114 of FIG. 1A, control computer 1006 of FIG. 10A, or control computer 1026 of FIG. 10B. In the example shown, at 1102, camera and (optionally) other sensor input is received. At 1104, the received camera/sensor data is used to generate or update a three-dimensional view of the workspace. At 1106, the next item to pick/place is determined, along with a strategy, plan, and trajectory to grasp, move, and place the item. The plan to grasp, move, and place the item is implemented/performed at 1108. If the pick/place was not performed successfully (1110), error handling is performed at 1112. For example, a next strategy/plan to pick/place the item may be determined and attempted, or human assistance may be requested. If the pick/place was performed successfully (1110) and further items are determined to need to be picked/placed (1114), processing returns to 1102 and a further iteration of steps 1102, 1104, 1106, 1108, and 1110 (and 1112 if necessary) are performed to pick/place a next item. Processing continues in this manner until all items have been picked/placed (1114).

In various embodiments, techniques disclosed herein may be used to extend the operational reach, functionality, and/or flexibility of a robot, such as a 6 DOF or other robotic arm.

Figure 12A:
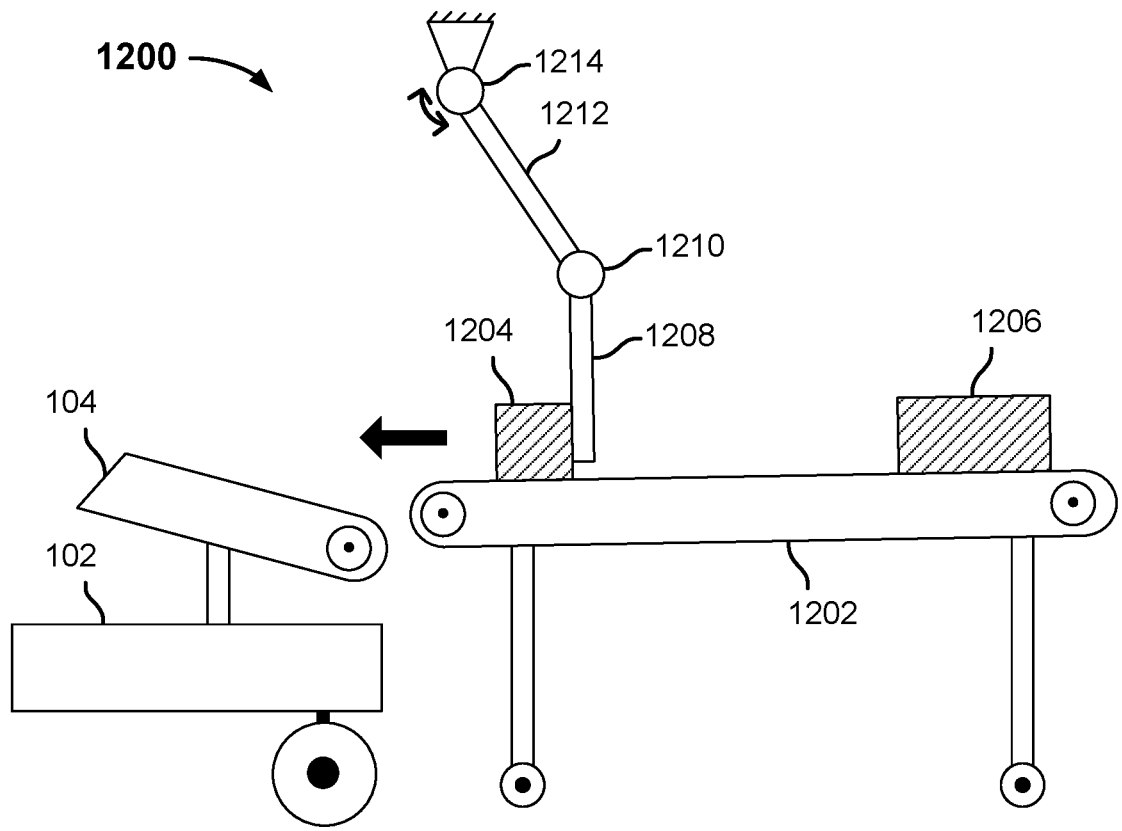
FIG. 12A illustrates an embodiment of a robotically controlled induction mechanism.

FIG. 12A illustrates an embodiment of a robotically controlled induction mechanism. In various embodiments, the mechanism 1200 of FIG. 12A may be used to facilitate or control the transfer of items from an upstream supply conveyance structure 1202 to a robotically controlled truck/container loader, or other robotic item handling system, as disclosed herein. In the example shown, mechanism 1200 includes a pusher bar or plate 1208 shown in a position to push item 1204 from the supply conveyance structure 1202 on the receiving (back) end of conveyor 104 on robotically-controlled mobile chassis 102. The pusher 1208 is coupled via a joint 1210 and upper link 1212 to a robotically (or otherwise) controlled bidirectional motorized joint 1214, mounted in this example to the overhead. \

In the state shown in FIG. 12A, the motorized joint 1214 may be actuated in the clockwise direction, to cause the pusher 1208 to push the box 1204 from behind onto the conveyor 104. In a subsequent movement, the motorized joint 1214 may be actuated in the counterclockwise direction (as shown) to lift the pusher 1208 up and out of the way, enabling the item 1206 to be advanced into a position in which the pusher 1208 may be positioned behind the item 1206, by clockwise actuation of the motorized joint 1214, and so on, as further items arrive via the conveyance structure 1202.

In various embodiments, upstream workers or systems not shown in FIG. 12A, e.g., human workers, robotic workers, or a combination of humans and robots, work to add items onto conveyance structure 1202 and advance them forward to the positions near the induction mechanism 1200. Motor-operated conveyors, roller type conveyances that use gravity and human or other workers to advance items, or some combination of different types of active and passive conveyance structures may be used.

In various embodiments, a robotic system as disclosed herein uses image data (e.g., from cameras as shown in FIGS. 9A, 9B, and 9C, and/or other cameras) to monitor a state of items on the conveyor 104 and arriving via conveyance structure 1202. As a quantity and/or density of items on conveyor 104 decreases, the induction mechanism 1202 is operated, or operated more quickly, to push (more) items onto the conveyor 104.

Figure 12B:
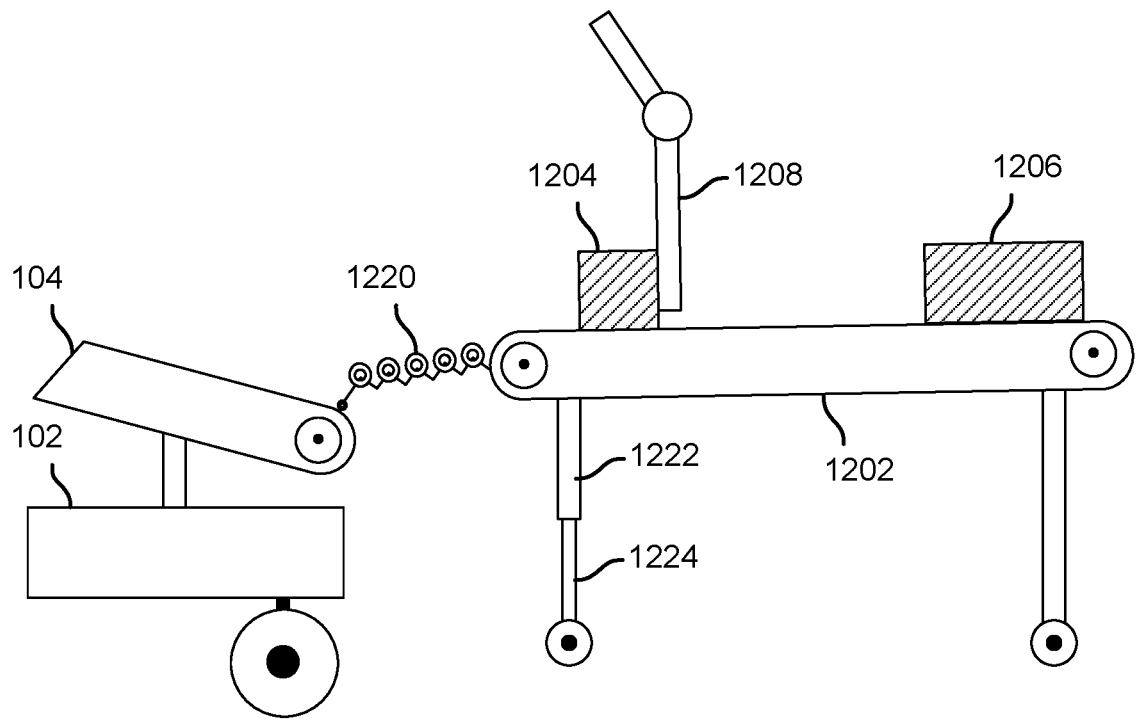
FIG. 12B illustrates an embodiment of a robotically controlled induction mechanism.

FIG. 12B illustrates an embodiment of a robotically controlled induction mechanism. In the example shown, an extendable bridge 1220 is provided and has been deployed to facilitate the transfer of items from the conveyance 1202 to the conveyor 104. In the example shown, extendable bridge 1220 comprises a spring or scissor-like structure having rollers disposed at the upper joints, to enable items to roll across the top. A roller at the distal end of extendable bridge 1220 provides support at the distal end. In some embodiments, the distal end may be secured to the conveyor 104, e.g., to maintain engagement as the mobile chassis 102 moves into or out of a truck or other container that is being loaded or unloaded. In some embodiments, the extendable bridge 1220 may be spring loaded, enabling some of the initial shock of the movement of the mobile chassis 102 into or out of the truck or other container to be absorbed, while maintaining connection and engagement.

In the example shown in FIG. 12B, the conveyance structure 1202 has variable height legs at the end nearest the conveyor 104, including a fixed upper leg portion 1222 and a variable length telescoping lower leg portion 1224. The variable height legs enable the height of the conveyance structure 1202 to be adjusted at that end, e.g., to enable the extendable bridge 1220 to be positioned, as shown, and for gravity to assist in the transfer of items from the conveyance structure 1202 to the conveyor 104. In some embodiments, a human or other worker may position one or more of the conveyance structure 1202, the variable height legs 1222, 1224, and the extendable bridge 1220.

Figure 13A:
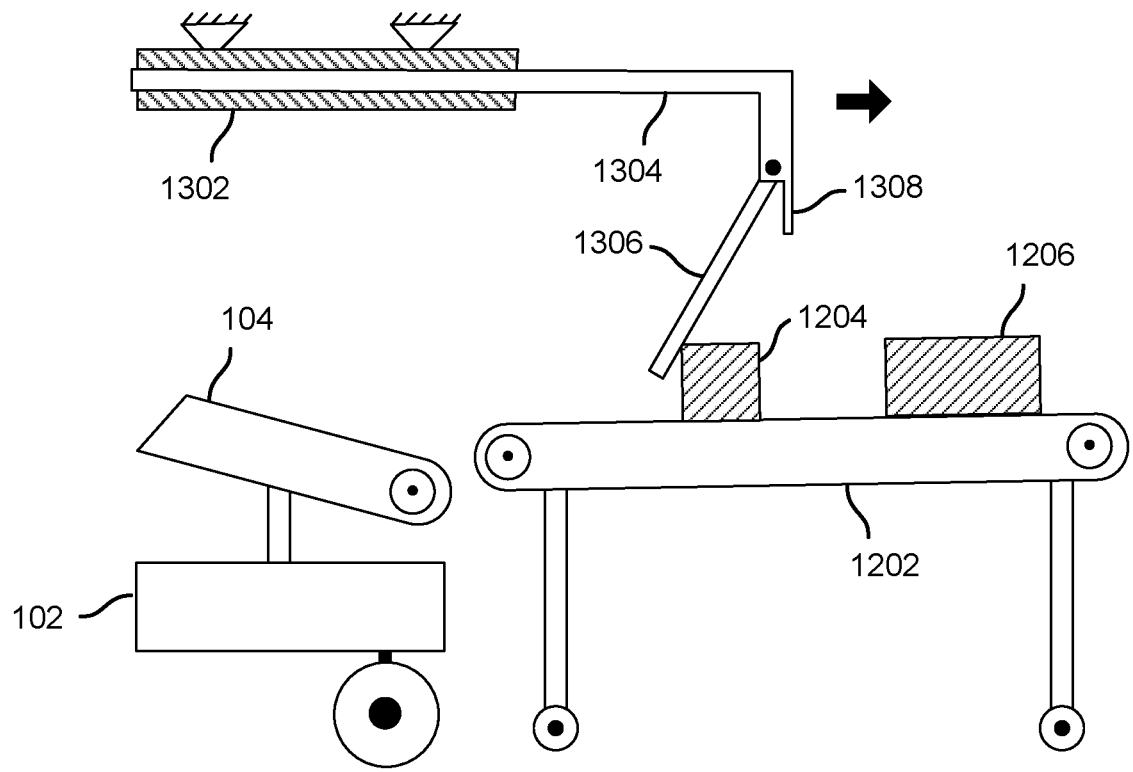
FIG. 13A illustrates an embodiment of a robotically controlled induction mechanism.

FIG. 13A illustrates an embodiment of a robotically controlled induction mechanism. In the example shown, a linear actuator assembly comprising a fixedly mounted housing and actuation mechanism 1302 and a stroke rod or shaft 1304 that is movable linearly within the housing and actuation mechanism 1302 by operation of the actuation mechanism, not shown in FIG. 13A (e.g., motor, gearbox, and lead screw or other linear actuation mechanism) is configured to move a unidirectional flap 1306 suspended from the stroke rod or shaft 1304, as shown. In the state shown in FIG. 13A, the stroke rod or shaft 1304 has been moved to the right by operation of the housing and actuation mechanism 1302, resulting in the unidirectional flap 1306 opening as it contacts the item 1204.

Figure 13B:
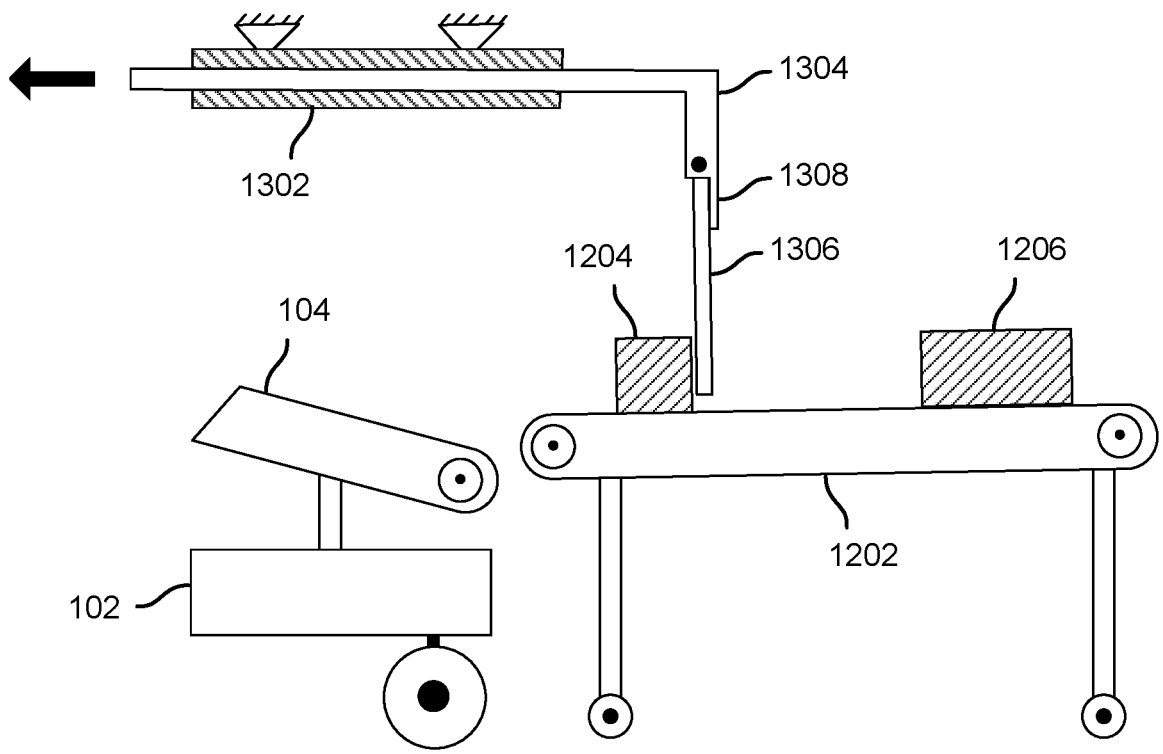
FIG. 13B illustrates an embodiment of a robotically controlled induction mechanism.

FIG. 13B illustrates an embodiment of a robotically controlled induction mechanism. In the example shown, the flap 1306 has been moved behind the item 1204 and is being actuated to move the stroke rod or shaft 1304 and the unidirectional flap 1306 to the left, as shown. A mechanical stop 1308 attached to and/or comprising an integrated part of the stroke rod or shaft 1304 prevents the flap from moving any further to the right than as shown, resulting in the flap 1306 pushing the item 1204 to the left and onto the conveyor 104. The linear actuator assembly 1302, 1304 then repeats with respect to item 1206 the operation as shown in FIGS. 13A and 13B.

In various embodiments, the linear actuator assembly 1302, 1304 of FIGS. 13A and 13B is operated under robotic control, as described above, e.g., to facilitate the movement of items onto conveyor 104, e.g., to ensure a steady flow of items at a desired rate of ingress to conveyor 104.

Figure 14A:
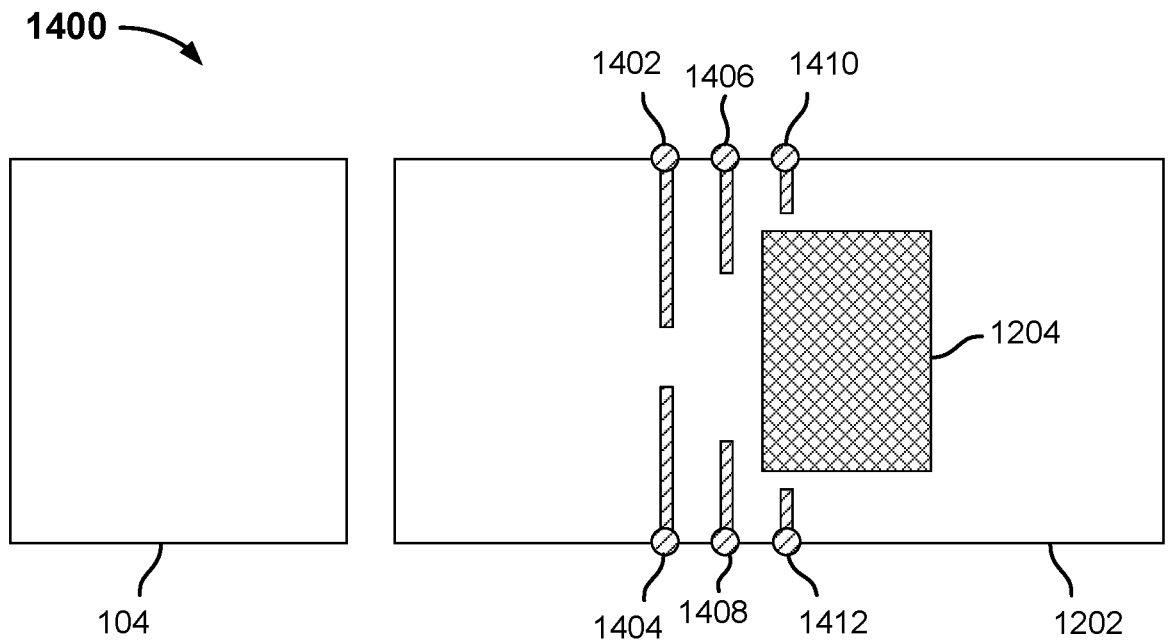
FIG. 14A illustrates an embodiment of a robotically controlled induction mechanism.

FIG. 14A illustrates an embodiment of a robotically controlled induction mechanism. In the example shown, cascading sets of linear-actuatable one way flaps 1402, 1404, 1406, 1408, 1410 and 1412 are provided. In various embodiments, boxes or other items of multiple different sizes must be supplied to the conveyor 104 from a supply conveyance such as conveyance 1202. Normally, a larger box would have to travel farther (e.g., along conveyance 1202) than a small box to allow a given set of flaps to close behind it. In various embodiments, f independently actuatable cascading sets of flaps are used, as in the example shown in FIG. 14A, so that the first set of flaps that fully engage a give box can be used to pull/push that box onto the conveyor 104.

Figure 14B:
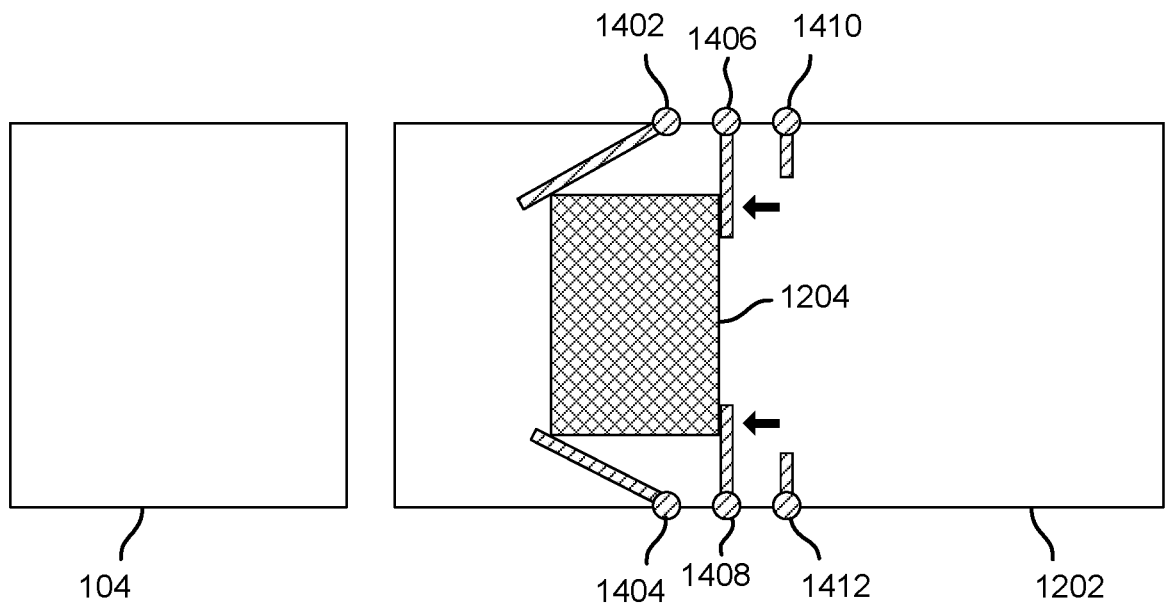
FIG. 14B illustrates an embodiment of a robotically controlled induction mechanism.

FIG. 14B illustrates an embodiment of a robotically controlled induction mechanism. In the example and state shown, item 1204 passed first through (or between) the flaps 1410, 1412, but those did not extend far enough in towards the center of the conveyance 1202 to be able to engage and pull/push the item 1204. As shown, the item 1204 has also passed completely through the flaps 1406, 1408, which are able to engage the item 1204 fully from behind as shown. The flaps 1406 and 1408 are shown to have been actuated, e.g., by independently operable linear actuators not shown in FIG. 14B, the move the flaps 1406, 1408 towards the conveyor 104, thereby pulling/pushing the item 1204 onto the conveyor 104.

In various embodiments, the cascading independently actuatable sets of flaps of FIGS. 14A and 14B are operated under robotic control, as described above, e.g., to facilitate the movement of items onto conveyor 104, e.g., to ensure a steady flow of items at a desired rate of ingress to conveyor 104. For example, images generated by cameras may be used to determine the first set of flaps that can fully engage a given item from behind, and a command or signal may be sent to cause that set of flaps to pull/push the item onto the conveyor 104.

Figure 15:
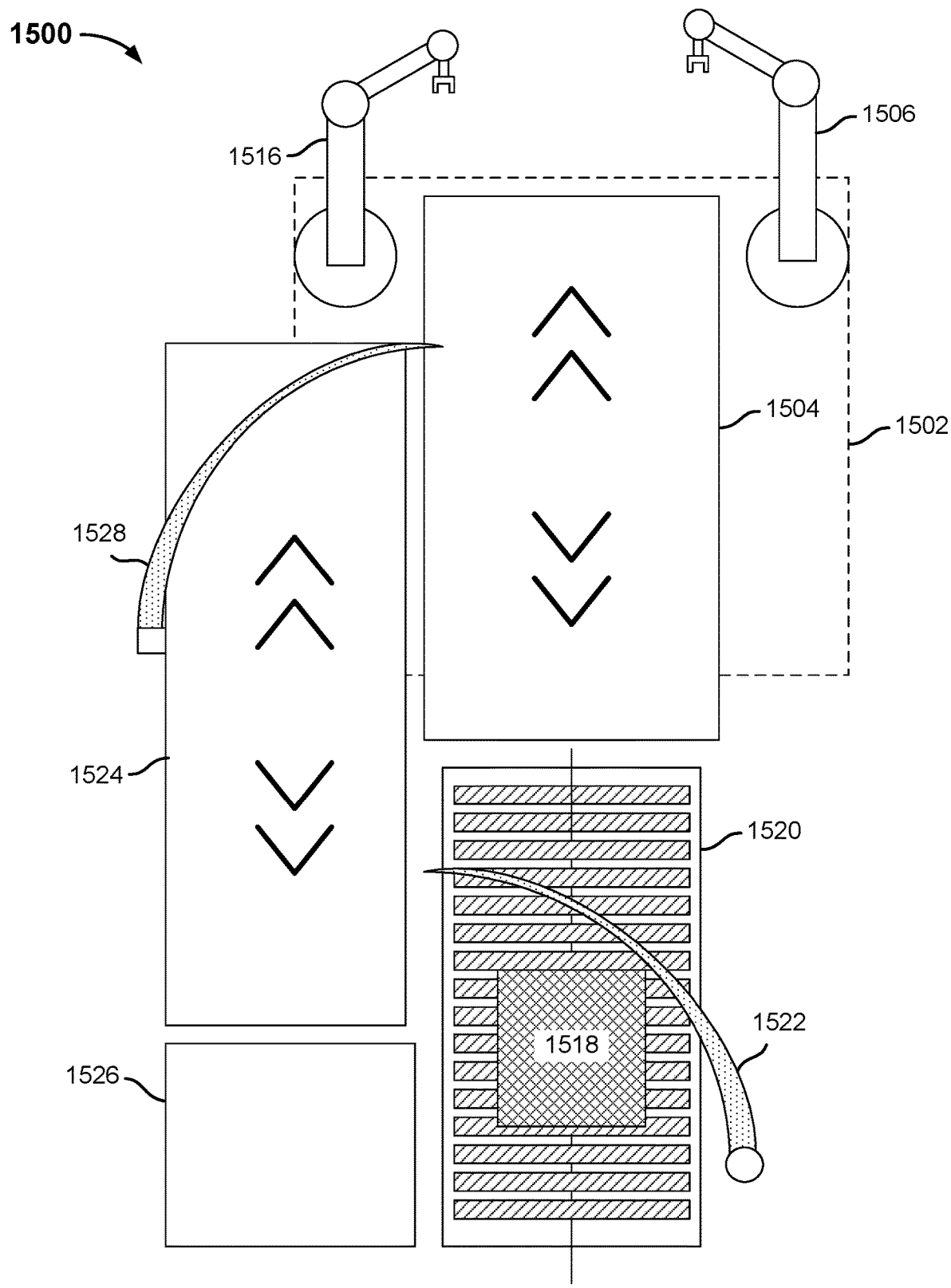
FIG. 15 illustrates an embodiment of a robotically controlled system to divert and reordering items.

FIG. 15 illustrates an embodiment of a robotically controlled system to divert and reordering items. In the example shown, the robotic system 1500 includes a mobile chassis 1502, a central conveyor 1504, and a pair of robotic arms disposed on opposite sides of the chassis 1502. Items, such as item 1518, arrive via a supply conveyance structure 1520. In the state shown, a robotically-controlled diverter 1522 has been moved into position to divert item 1518 to a side conveyor 1524. Side conveyor 1524 may be mounted on mobile chassis 1502 or positioned alongside mobile chassis 1502. Side conveyor 1524 is operated under robotic control, e.g., to cache the item 1518 by moving it back (downward as shown) into a accumulator 1526. The accumulator 1526 may comprise a variety of structures to receive, hold, and return items. For example, the accumulator 1526 may include a plurality of vertically repositionable receptacles. The item 1518 may be placed in a designated one of the receptacles. When the system 1500 is ready to handle item 1518, the receptacle holding item 1518 may be positioned and an actuator comprising the accumulator 1526 activated to cause the item 1518 to move back onto the side conveyor 1524. For example, the accumulator may use a pusher mechanism, or a tilting shelf, to expel the item 1518. The side conveyor 1524 may be operated in the forward (upward, as shown) direction to assist in pulling the item 1518 out of the accumulator 1526 and back onto the side conveyor 1524. The side conveyor 1524 then continues to advance the item 1518 forward until it engages with a fixed (in this example) diverter 1528, which diverts the item 1518 onto the main, central conveyor 1504, which in turn receives and positions the item 1518 for retrieval by one or both of the robotic arms 1506, 1516.

In various embodiments, a robotic system as disclosed herein may determine, autonomously, to divert an item, such as item 1518 in the example above, for one or more reasons, such as to reorder items for load onto a truck or other container. For example, if a base layer has been constructed and a large, heavy item 1518 is seen to be arriving via the supply conveyance 1520, the robotic system may determine to divert and cache the item 1518 in the accumulator 1526, as described above, to be able to first receive and load smaller items seen or expected to be arriving after the item 1518. For example, the computer vision system may see the items arriving after item 1518 and determine based on their perceived size and/or looked up attributes that it would be advantageous to place them prior to placing item 1518. Or, the system may have an invoice or manifest of the items expected to be loaded in a given truck or container. The system may track what has been received and loaded already and may compute a probability that an item arriving after item 1518 will be more suitable to handle next.

Figure 16A:
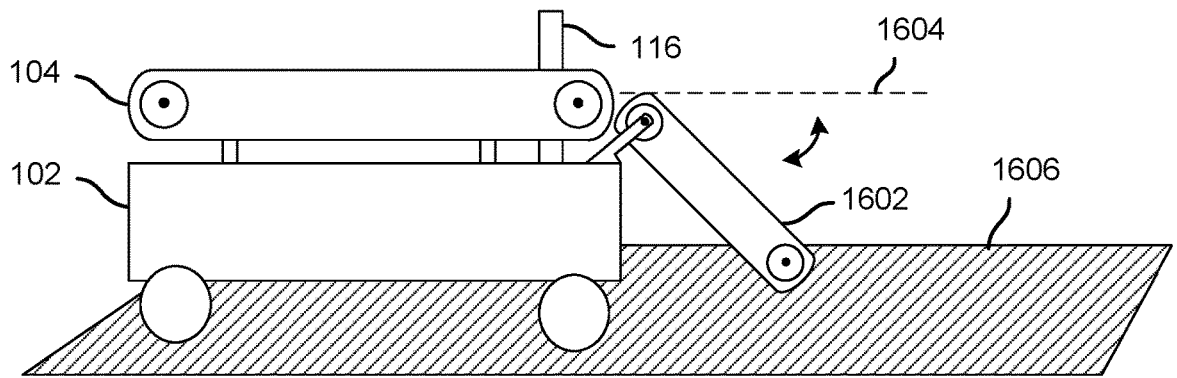
FIG. 16A illustrates an embodiment of a robotically controlled loading system to load a truck or other container.

FIG. 16A illustrates an embodiment of a robotically controlled loading system to load a truck or other container. In the example shown, a robotic truck/container loading system as disclosed herein includes a mobile chassis 102, conveyor 104, and a one or more robotic arms, such as robotic arm 116 (shown only partially and without an opposite side pair to avoid obscuring other features). In various embodiments, the system detects arrival of an item that may be too heavy to lift and move from the conveyor 104 using the robotic arms, such as robotic arm 116. In response, the system deploys a helper conveyance structure 1602 as shown. In various embodiments, helper conveyance structure 1602 may comprise one or more of a table, a slide, a chute, and a motor-actuated conveyance, such as a conveyor belt. Initially, to receive the heavy item, the helper conveyance structure 1602 is positioned at a horizontal position, adjacent to the conveyor 104, as represented by dashed line 1604. Conveyor 104 and/or helper conveyance structure 1602 operate to push/pull the item onto helper conveyance structure 1602, which is then actuated to move into the position as shown in FIG. 16A. The item slides, or is conveyed, or is pushed using the robotic arm(s) (e.g., 116) down the helper conveyance structure 1602 to the floor 1606. The mobile chassis 102 may be moved under robotic control, prior to the operation just described, to position the mobile chassis 102 and the elements mounted on mobile chassis 102 in a position, location, and orientation determined to be most likely to result in the item being deposited at a desired location on the floor 1606.

Figure 16B:
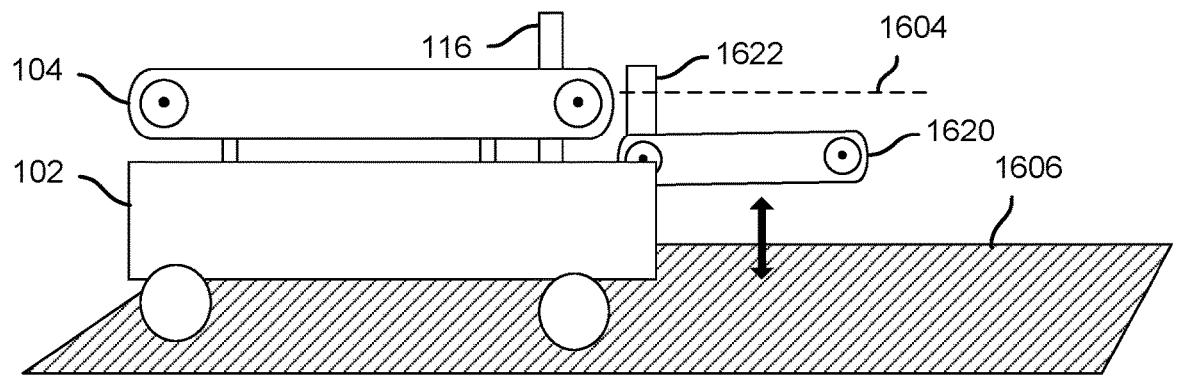
FIG. 16B illustrates an embodiment of a robotically controlled loading system to load a truck or other container.

FIG. 16B illustrates an embodiment of a robotically controlled loading system to load a truck or other container. In the example shown, the helper conveyance structure 1602 of FIG. 16A is replaced by a vertically movable helper conveyor 1620. In various embodiments, vertically movable helper conveyor 1620 is moved by a guide and lift drive 1622 from positions between an upper position in line with the conveyor 104, to enable an item to be moved onto the helper conveyor 1620, to a position at or near the floor 1606. A heavy item moved onto helper conveyor 1620, e.g., from conveyor 104, is moved to the floor by lowering the helper conveyor 1620 to the floor, under robotic control, and operating the helper conveyor 1620 to push the item off the helper conveyor 1620 and onto the floor 1606.

Figure 16C:
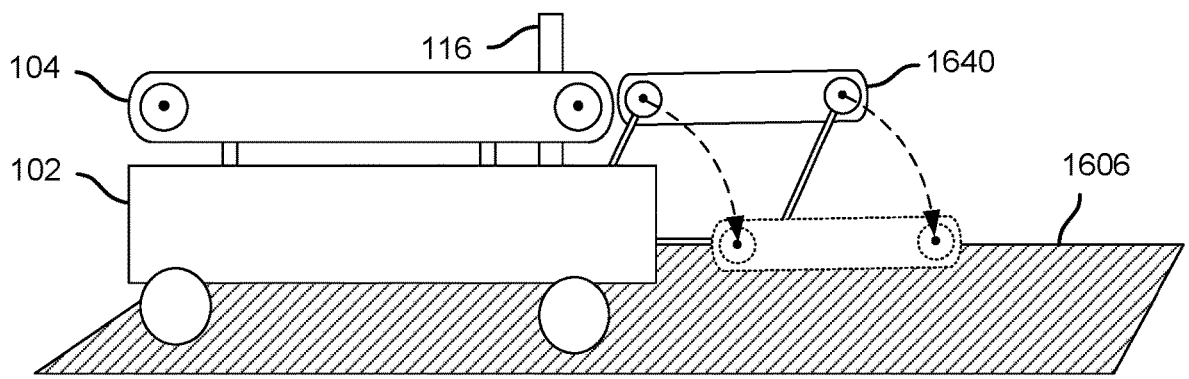
FIG. 16C illustrates an embodiment of a robotically controlled loading system to load a truck or other container.

FIG. 16C illustrates an embodiment of a robotically controlled loading system to load a truck or other container. In the example shown, the helper conveyance structure 1602 of FIG. 16A is replaced by a four-bar linkage connected helper conveyor 1640. To receive an item, the helper conveyor 1640 is positioned as shown. Once an item has been moved onto the helper conveyor 1640, the helper conveyor 1640 is lowered to the floor 1606, into the position as shown in dashed lines, and operated to cause the item to move off the helper conveyor 1640 and onto the floor 1606.

Figure 17:
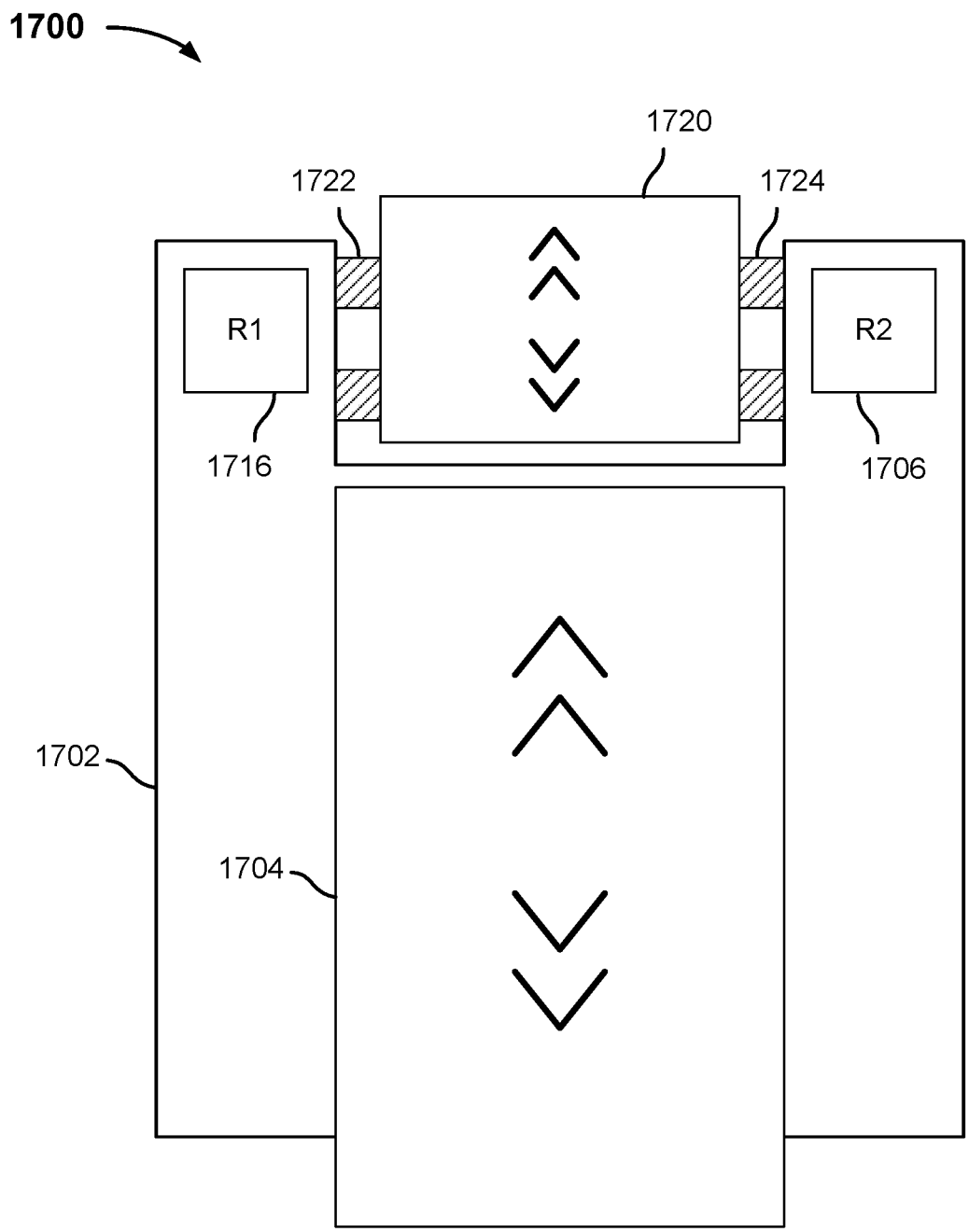
FIG. 17 illustrates an embodiment of a robotically controlled loading system to load a truck or other container.

FIG. 17 illustrates an embodiment of a robotically controlled loading system to load a truck or other container. In the example shown, the robotic system 1700 is shown from the top to include a mobile chassis 1702, a central conveyor 1704, and robotic arms 1706, 1716. Mobile chassis 1702 includes a cutout to accommodate helper conveyance 1720 and associated structures 1722, 1724 to lower or raise the helper conveyance 1720. In various embodiments, the helper conveyance 1720 may be any one of the designs shown in FIGS. 16A, 16B, and 16C, or another conveyance structure.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic system, comprising:
  a robotic arm having n degrees of freedom, the robotic arm comprising a base and a set of serially connected links and joints connected to the base at a proximal end and terminating at a free moving distal end;
  an enabler joint assembly comprising a mounting location at which the base of the robotic arm is mounted and having a rotational axis, offset from the mounting location, about which the enabler joint assembly is configured to rotate the mounting location; and
  a processor configured to control a first set of motors, each motor being associated with a corresponding one of the n degrees of freedom of the robotic arm, and an enabler joint motor comprising the enabler joint assembly to control operation of the robotic arm within an extended operating space defined at least in part by the n degrees of freedom of the robotic arm and an $(n+1)^{th}$ degree of freedom provided by the enabler joint assembly.

2. The system of claim 1, wherein the enabler joint assembly comprises a transfer plate that is coupled mechanically to the mounting location to which the base of the robotic arm is mounted and a fixedly mounted enabler joint assembly base relative to which the transfer plate is rotated about the rotational axis of the enabler joint assembly.

3. The system of claim 2, wherein the enabler joint assembly base is fixedly mounted to a robotically controlled mobile chassis.

4. The system of claim 3, wherein the enabler joint assembly base supports an enabler joint motor configured to rotate the transfer plate about the rotational axis.

5. The system of claim 2, wherein the enabler joint assembly base is fixedly mounted to the robotically controlled mobile chassis in a manner such that the rotational axis of the enabler joint assembly is oriented at an acute non-right angle to a vertical axis.

6. The system of claim 5, wherein a geometry of the transfer plate is such that rotation of the transfer plate about the rotational axis of the enabler joint assembly, from a center or neutral position, results in the mounting location and the robotic arm being tilted in a direction of the rotation.

7. The system of claim 5, wherein a geometry of the transfer plate is such that rotation of the transfer plate about the rotational axis of the enabler joint assembly, from a center or neutral position, results in the mounting location and the robotic arm being moved away from a structure adjacent to the enabler joint assembly.

8. The system of claim 5, wherein the geometry of the transfer plate and orientation of the rotational axis of the enabler joint assembly are such that the mounting location is substantially parallel to the ground when the enabler joint assembly is in a center or neutral position.

9. The system of claim 5, wherein the geometry of the transfer plate and orientation of the rotational axis of the enabler joint assembly are such that the mounting location is tilted at an angle relative to the ground when the enabler joint assembly is in a center or neutral position.

10. The system of claim 2, wherein the mounted location comprises an integrated part of the transfer plate.

11. The system of claim 1, wherein the processor comprises one or more of a control computer, robotic arm controller, an enabler joint assembly controller, and an integrated controller configured to control both the robotic arm and the enabler joint assembly.

12. The system of claim 1, wherein the processor is configured to receive image data, generate a three-dimensional view of a workspace in which the robotic system is deployed, and use the three-dimensional view of the workspace to generate and implement a plan to use the robotic arm and enabler joint assembly to perform a task with respect to an item in the workspace.

13. The system of claim 1, wherein the processor is configured to rotate the enabler joint assembly in a forward direction to increase a reach distance associated with the robotic arm.

14. The system of claim 1, wherein the processor is configured to rotate the enabler joint assembly in a forward direction or a back direction to position the robotic arm to perform a task with a without requiring the robotic arm to be placed in an awkward pose.

15. The system of claim 1, wherein the robotic arm comprises a first robotic arm and the enabler joint assembly comprises a first enabler joint assembly; first robotic arm and the first enabler joint assembly are disposed on a first side of a robotically controlled mobile chassis; and a second robotic arm and a second enabler joint assembly are disposed on a second side of the robotically controlled mobile chassis.

16. The system of claim 14, wherein a robotically controlled conveyor is disposed between the first robotic arm and first enabler joint assembly and the second robotic arm and second enabler joint assembly.

17. The system of claim 15, wherein the processor is configured to perform a task by controlling one or more of the chassis, the conveyor, the first robotic arm, the first enabler joint assembly, the second robotic arm, and the second enabler joint assembly.

18. The system of claim 16, wherein the processor is configured to use the first enabler joint assembly to rotate the first robotic arm forward and to use the second enabler joint assembly to rotate the second robotic arm back to perform a pick or place task with respect to a location nearer to the second robotic arm than to the first robotic arm.

19. A method of controlling a robotic system comprising a robotic arm having n degrees of freedom, the robotic arm comprising a base and a set of serially connected links and joints connected to the base at a proximal end and terminating at a free moving distal end, and an enabler joint assembly comprising a mounting location at which the base of the robotic arm is mounted and having a rotational axis, offset from the mounting location, about which the enabler joint assembly is configured to rotate the mounting location, the method comprising using a processor to control a first set of motors, each motor being associated with a corresponding one of the n degrees of freedom of the robotic arm, and an enabler joint motor comprising the enabler joint assembly to control operation of the robotic arm within an extended operating space defined at least in part by the n degrees of freedom of the robotic arm and an $(n+1)^{th}$ degree of freedom provided by the enabler joint assembly.

20. A computer program product, embodied in a non-transitory computer readable medium, to control a robotic system comprising a robotic arm having n degrees of freedom, the robotic arm comprising a base and a set of serially connected links and joints connected to the base at a proximal end and terminating at a free moving distal end, and an enabler joint assembly comprising a mounting location at which the base of the robotic arm is mounted and having a rotational axis, offset from the mounting location, about which the enabler joint assembly is configured to rotate the mounting location, the computer program product comprising computer instructions to control a first set of motors, each motor being associated with a corresponding one of the n degrees of freedom of the robotic arm, and an enabler joint motor comprising the enabler joint assembly to control operation of the robotic arm within an extended operating space defined at least in part by the n degrees of freedom of the robotic arm and an $(n+1)^{th}$ degree of freedom provided by the enabler joint assembly.

* * * * *